United States Patent
Sato et al.

(10) Patent No.: US 10,261,902 B2
(45) Date of Patent: Apr. 16, 2019

(54) PARALLEL PROCESSING OF A SERIES OF DATA UNITS FOR WRITING

(71) Applicant: TOSHIBA MEMORY CORPORATION, Tokyo (JP)

(72) Inventors: Yoshiei Sato, Ota Tokyo (JP); Mototaka Kanematsu, Yokohama Kanagawa (JP); Kenji Takahashi, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 274 days.

(21) Appl. No.: 15/397,865

(22) Filed: Jan. 4, 2017

(65) Prior Publication Data

US 2017/0192889 A1 Jul. 6, 2017

Related U.S. Application Data

(60) Provisional application No. 62/274,504, filed on Jan. 4, 2016.

(51) Int. Cl.
| | |
|---|---|
| *G06F 15/16* | (2006.01) |
| *G06F 12/0811* | (2016.01) |
| *H04L 29/08* | (2006.01) |
| *G06F 3/06* | (2006.01) |

(52) U.S. Cl.
CPC .......... *G06F 12/0811* (2013.01); *G06F 3/067* (2013.01); *G06F 3/0619* (2013.01); *G06F 3/0659* (2013.01); *H04L 67/1097* (2013.01); *G06F 2212/283* (2013.01)

(58) Field of Classification Search
CPC .... G06F 12/0811; G06F 3/067; G06F 3/0659; G06F 3/0619; H04L 67/1097
USPC ......................................... 709/201, 224, 203
See application file for complete search history.

(56) References Cited

U.S. PATENT DOCUMENTS

| | | | |
|---|---|---|---|
| 6,886,041 B2 | 4/2005 | Messinger et al. | |
| 7,047,337 B2 | 5/2006 | Armstrong et al. | |
| 8,086,585 B1 * | 12/2011 | Brashers ........... | G06F 17/30171 |
| | | | 707/705 |
| 2009/0172276 A1 * | 7/2009 | Nochimowski ....... | G06F 3/0607 |
| | | | 711/114 |

(Continued)

FOREIGN PATENT DOCUMENTS

| | | |
|---|---|---|
| JP | H0773085 | 3/1995 |
| JP | 2005505833 A | 2/2005 |
| JP | 2006524381 A | 10/2006 |

(Continued)

*Primary Examiner* — Philip B Tran

(74) *Attorney, Agent, or Firm* — Kim & Stewart LLP

(57) ABSTRACT

A storage system includes a plurality of storage devices, and a server including a memory and an interface. The server is configured to store, in the memory, each of data pieces that are received through the interface from a client as a series of data to be written, in association with a single write command or a series of write commands received through the interface from the client, for each data piece, determine a target storage device and a logical address thereof at which the data piece is to be written, based on an identifier of the data piece received in association with the data piece through the interface from the client, and carry out, in parallel, writing of the data pieces stored in the memory at the determined logical addresses.

20 Claims, 18 Drawing Sheets

(56) References Cited

U.S. PATENT DOCUMENTS

| 2012/0151158 | A1* | 6/2012 | Yeh | G06F 12/0246 |
| | | | | 711/154 |
| 2014/0223243 | A1* | 8/2014 | Robin | G06F 3/0619 |
| | | | | 714/54 |

FOREIGN PATENT DOCUMENTS

| JP | 2011053932 A | 3/2011 |
| JP | 2015041291 A | 3/2015 |

* cited by examiner

114

| REQUEST ID | EXECUTABLE COMMAND TYPE | ARGUMENTS (KEY & VALUE) | EXECUTION RESULT |
|---|---|---|---|
| 1 | WRITE COMMAND | AAA, DATA | LOCKED |
| 2 | WRITE COMMAND | AAB, DATA | LOCKED |
| ... | ... | ... | ... |

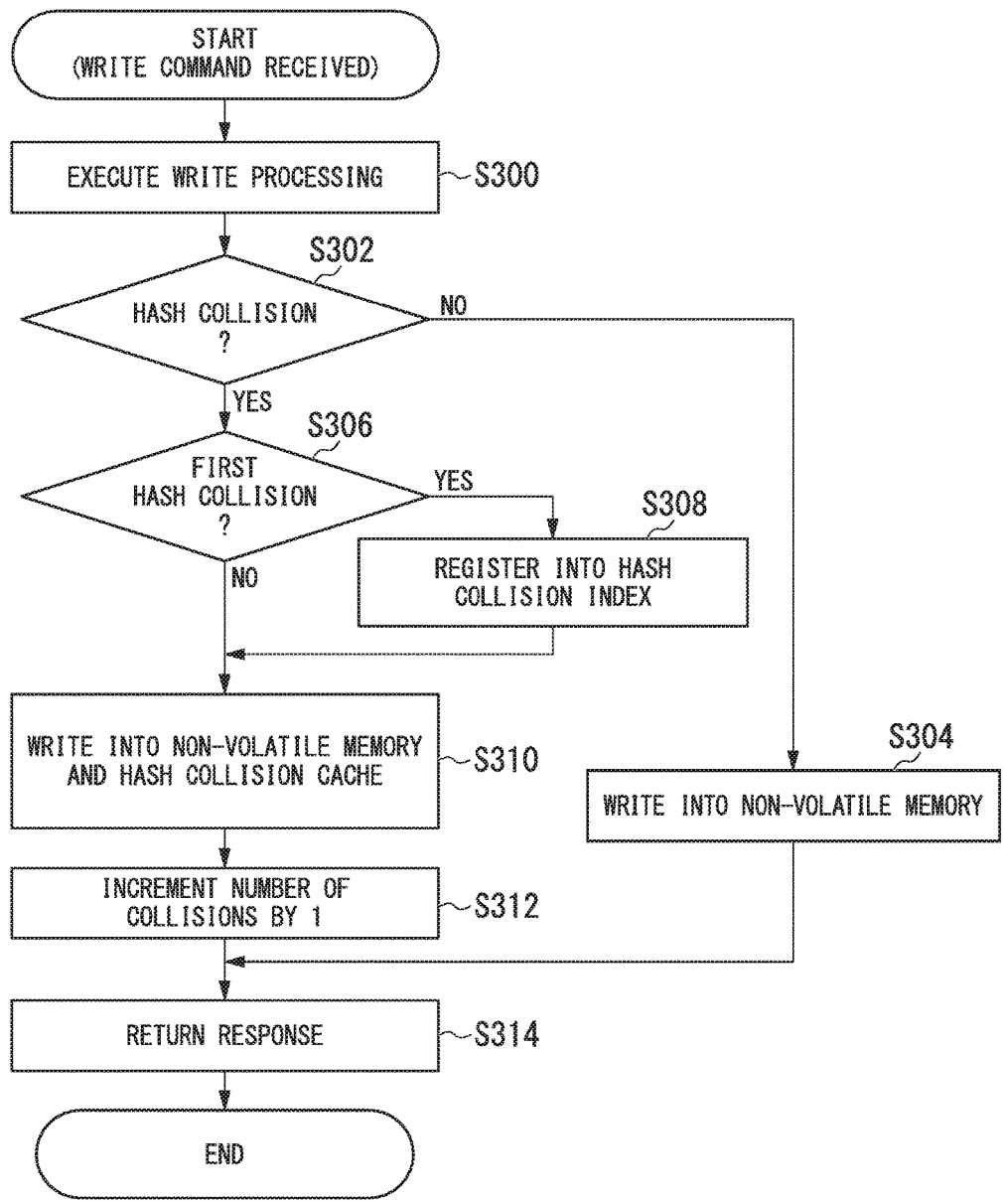

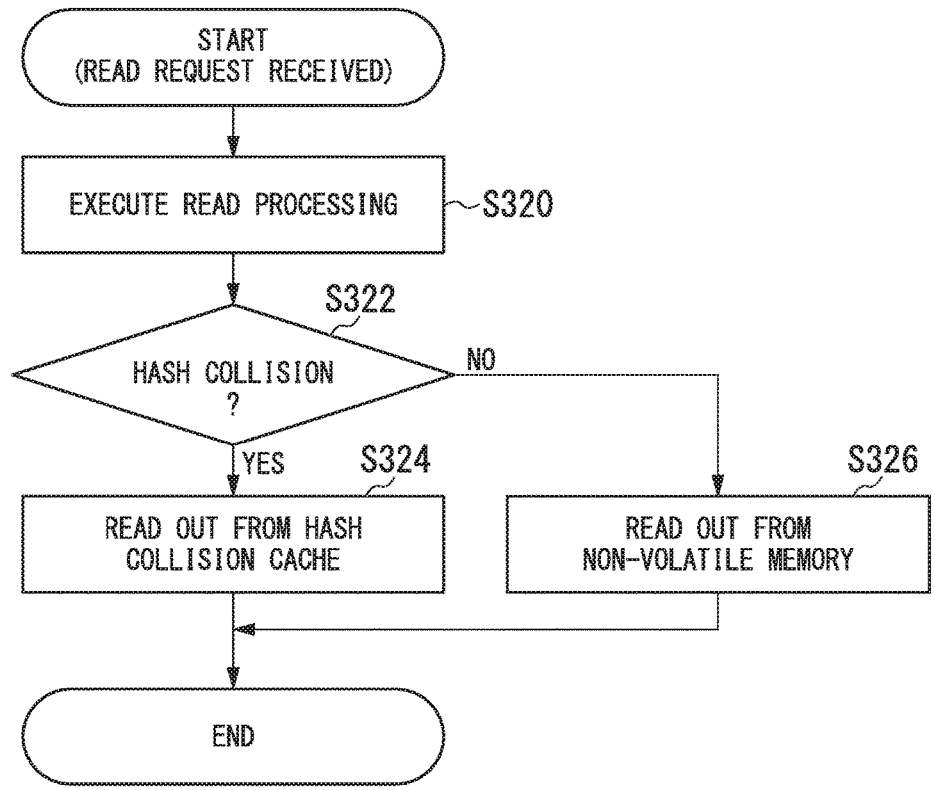

PARALLEL PROCESSING OF A SERIES OF DATA UNITS FOR WRITING

CROSS-REFERENCE TO RELATED APPLICATIONS

This application is based upon and claims the benefit of priority from U.S. Provisional Patent Application No. 62/274,504, filed on Jan. 4, 2016, the entire contents of which are incorporated herein by reference.

FIELD

Embodiments described herein relate generally to a storage system and a method of operating the same.

BACKGROUND

A distributed storage system is known.

BRIEF DESCRIPTION OF THE DRAWINGS

FIG. 10 is a flowchart showing an example of a flow of processing executed in the storage device.

FIG. 11 shows an example of information stored as a hash collision index.

FIG. 12 is a flowchart showing an example of another flow of processing executed by the storage device.

FIG. 13 shows an example of a primary request stored in the request result list according to a modification example of the first embodiment.

DETAILED DESCRIPTION

A storage system according to an embodiment includes a plurality of storage devices, and a server including a memory and an interface. The server is configured to store, in the memory, each of data pieces that are received through the interface from a client as a series of data to be written, in association with a single write command or a series of write commands received through the interface from the client, for each data piece, determine a target storage device and a logical address thereof at which the data piece is to be written, based on an identifier of the data piece received in association with the data piece through the interface from the client, and carry out, in parallel, writing of the data pieces stored in the memory at the determined logical addresses.

A storage system and a method according to embodiments will be described below with reference to the drawings.

First Embodiment

[Overall Configuration]

Figure 1:
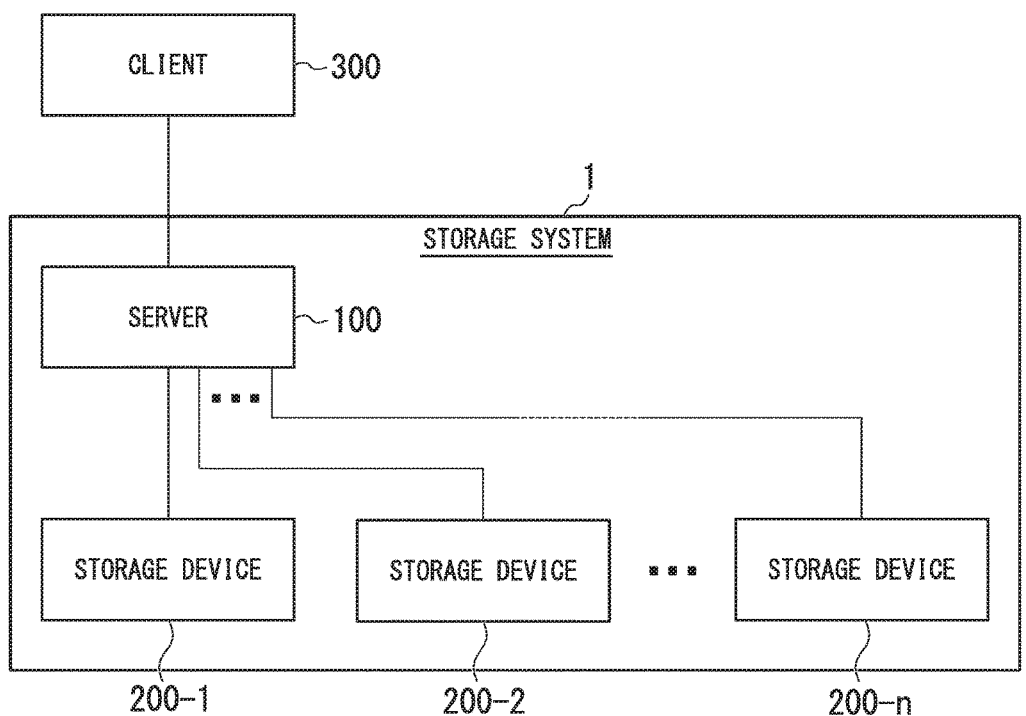
FIG. 1 shows an overall configuration of a storage system according to a first embodiment.

FIG. 1 shows an overall configuration of a storage system according to a first embodiment. The storage system 1 includes one or more servers 100 and a plurality of storage devices 200-1, 200-2, . . . , 200-n (where n is a natural number of 2 or larger). In the following, unless a distinction is made of a particular storage device, each of the storage devices will be referred to simply as a storage device 200.

Each of the storage devices 200 includes at least a non-volatile memory, and is a device or medium that can communicate with a server 100 either by cable or wirelessly. The "device" is not limited to one housed in an enclosure and may be, for example, a group of elements mounted on a board. In addition to typical storage devices such as a hard-disk drive (HDD) and a solid-state drive (SSD), the storage device 200 includes a device of an arbitrary form, using a semiconductor storage medium such as a NAND-type memory or using a storage medium such an MRAM.

The server 100 and the storage device 200 may be housed within the same enclosure so as to appear to be a single device, or may be physically separated.

The server 100 communicates with a client 300 and receives various commands, including write commands, from the client 300. Commands include those that instruct to write and read out data, and those that instruct to delete data. The server 100, based on a command received from the client 300, internally generates a primary request and transmits a secondary request (an example of a request) based on the primary request to the storage device 200. This procedure of requests will be described below.

The client 300 may be an information processing device used by a user of the storage system 1, and may be a device that transmits various commands to the storage system 1 based on commands received from another device. The client 300 may be a device that generates and transmits to the storage system 1 various commands, based on the result of internal information processing.

[Server]

Figure 2:
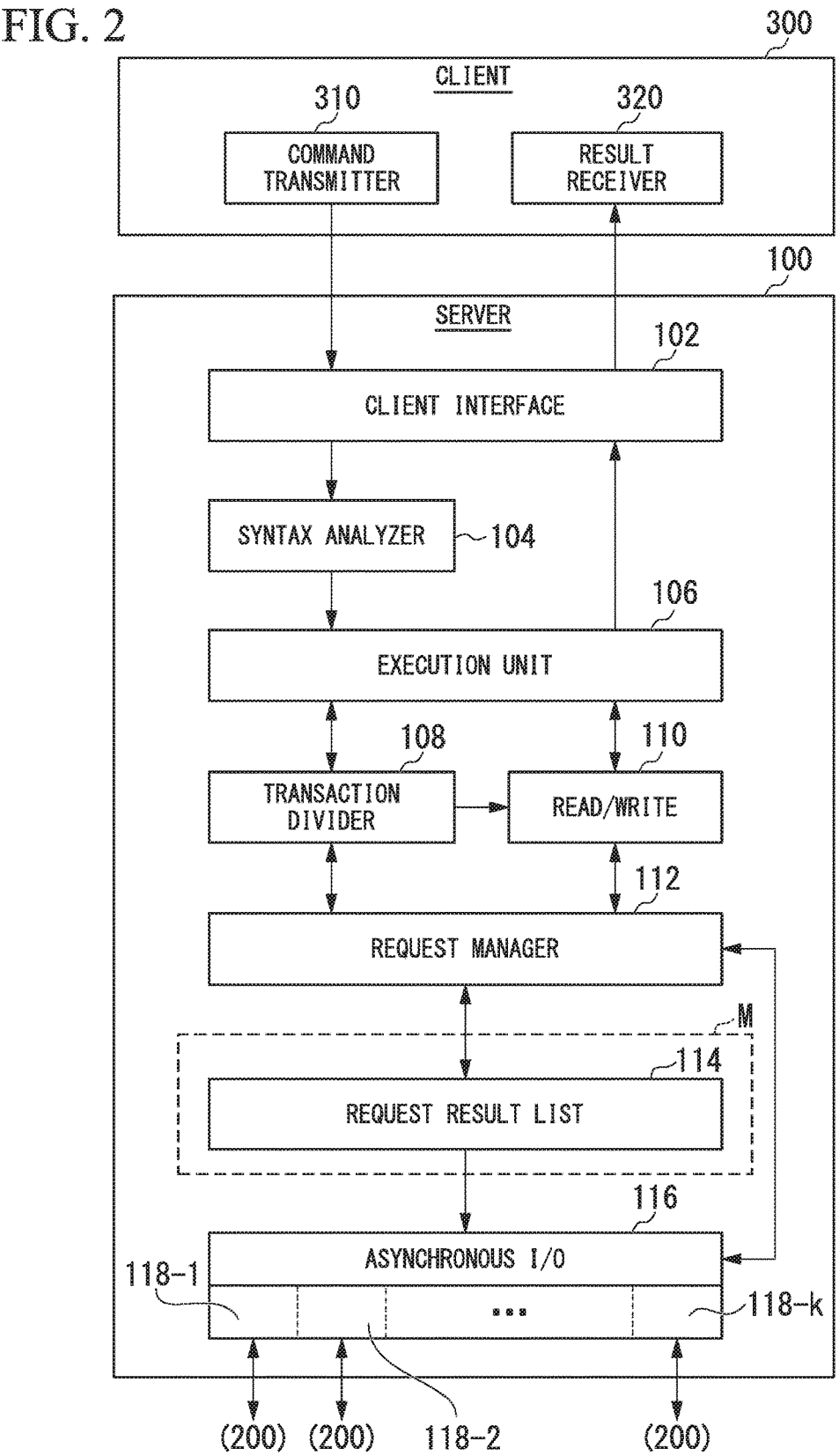
FIG. 2 shows a configuration of a server and a client in the storage system.

FIG. 2 shows a configuration of the server 100 and the client 300. The client 300 includes a command transmitter 310 and a result receiver 320. The command transmitter 310 transmits commands to the server 100. The result receiver 320 receives results of processing the commands from the server 100.

The server 100 includes a client interface 102, a syntax analyzer 104, an execution unit 106, a transaction divider 108, a read/write (a plurality of read/write units) 110, a request manager 112, a request result list 114, and an asynchronous I/O 116, but is not restricted to these elements.

The syntax analyzer 104, the execution unit 106, the transaction divider 108, the read/write 110, the request manager 112, and the asynchronous I/O 116 may be implemented by a processor such as a CPU (central processing unit) executing a program stored in a program memory (not shown). A part or all of these may be implemented by circuitry including hardware such as an LSI (large-scale integration) device, an ASIC (application-specific integrated circuit), or an FPGA (field-programmable gate array). The syntax analyzer 104, the execution unit 106, the transaction divider 108, the read/write 110, the request manager 112, and the asynchronous I/O 116 may be implemented by different processors.

The request result list 114 is a table stored in a memory M. The memory M is a writable storage medium such as a RAM (random-access memory) or a flash memory.

The client interface 102 may be a SATA (Serial ATA) interface or a SAS (serial attached SCSI) interface, but is not limited to these. The client interface 102 receives commands from the command transmitter 310.

The syntax analyzer 104 interprets the syntax of the commands received via the client interface 102 and provides results of the interpretation to the execution unit 106.

The execution unit 106 provides the command contents to the transaction divider 108 or the read/write 110, based on the results provided from the syntax analyzer 104. If the contents of the command provided by the syntax analyzer 104 include an instruction for transaction processing, the execution unit 106 provides those contents to the transaction divider 108. If the contents do not include the instruction for transaction processing, the execution unit 106 provides the contents to the read/write 110. If the command contents provided by the syntax analyzer 104 do not include an instruction for transaction processing, the execution unit 106 may perform processing to transmit data to the storage device 200 without passing through transaction divider 108 or read/write 110.

The transaction processing in the present embodiment is performed through a plurality of steps, based on a plurality of write commands received from the client 300 as a series of processing. Transaction processing may be carried out upon receiving information including a plurality of write commands at one time, or upon receiving a plurality of write commands to which common information indicating that the write command is for a series of processing (for example, transaction processing identification information) is appended. The transaction processing may be carried out upon receiving one write command, as opposed to a plurality of write commands. The following description will be for transaction processing carried out upon receiving a plurality of write commands.

According to the transaction processing, if verification is made that all processing of a certain step has been completed with respect to a plurality of write commands, the processing of the next step is executed. The steps of the transaction processing will be described below.

The transaction divider 108 starts a read/write 110 with respect to each of the plurality of write commands processed in the transaction processing. Each of the read/writes 110 provides to the request manager 112 a primary request that gives an instruction to, for example, write, read, or delete data.

The request manager 112 stores the primary request provided by the read/write 110 in the request result list 114 of the memory M.

Figures 3, 4:
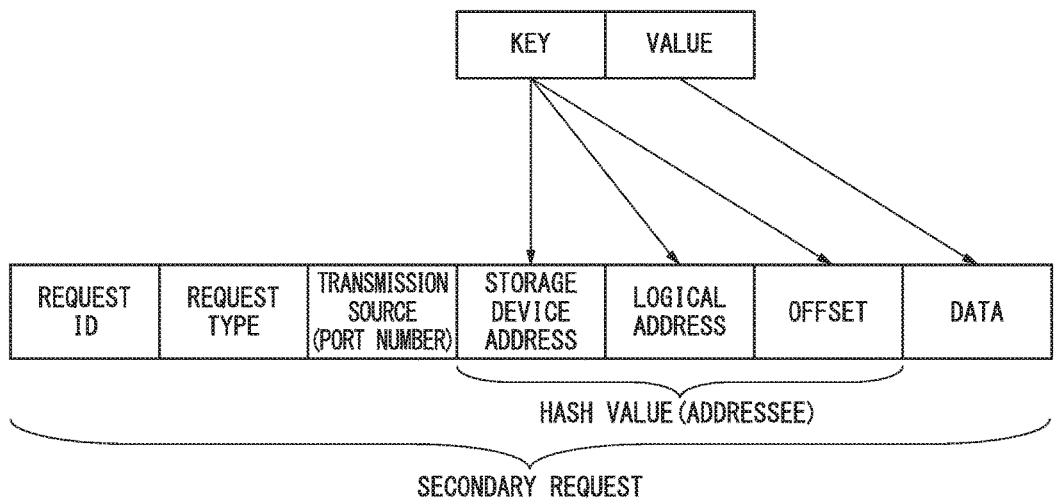
FIG. 3 shows an example of primary requests stored in a request result list that is stored in the server.
FIG. 4 shows contents of a secondary request that is generated from the primary request.

FIG. 3 shows an example of primary requests stored in the request result list 114. The request result list 114 stores information such as the request ID (identifier), the command type, the arguments, and the execution result.

The request ID is information identifying the primary request. The request ID is, for example, a serial number generated by the request manager 112.

The command type includes a write command, a read command, and a delete command.

The arguments include key information (hereinafter simply referred to as the key) and a value. The key is data identifier that is arbitrarily generated by the client 300. The value is the data for which an instruction is given by the client 300 to write into the storage device 200. A write command received from the client 300 may include a key and a value. The key and the value may be received from the client 300, separately from a write command received from the client 300. If the command type is not a write command, the value is omitted.

The execution result refers to the result of processing at each step of the transaction processing.

The asynchronous I/O 116 reads out a record stored in the request result list 114 and transmits the data included in the read-out record to one of the plurality of storage devices 200. The record is one primary request associated with one request ID in the request result list 114.

If a plurality of records is stored in the request result list 114, the asynchronous I/O 116 generates and/or starts transmission processors 118-1, 118-2, 118-k corresponding to the number of records. In the following, unless distinction is made among the transmission processors, each of the transmission processors will be referred to simply as a transmission processor 118. "Generating a transmission processor 118" refers to calling a virtual transmission processor 118 implemented by software and causing the transmission processor 118 to start processing. In this case, the transmission processor 118 is a virtual machine (multithreading) implemented to perform processing in parallel by time-division of one or a plurality of processors. "Starting a transmission processor 118" refers to starting the processing in a transmission processor 118 implemented by hardware. The transmission processor 118 may include a portion implemented by software and a portion implemented by hardware such as a physical port. The server 100 may have hardware that serves as a processing agent, such as a processor, an LSI device, an ASIC, or an FPGA for each transmission processor 118.

Each of the transmission processors 118 transmits secondary requests to the storage device 200 independently of the other transmission processors 118. "Transmitting data independently of the other transmission processors 118" means transmitting of a secondary request at its own timing, regardless of the progress of the other transmission processors 118. "Regardless of the progress of the other transmission processors 118" means transmitting without regard to what step (for example, whether they have completed transmission processing or not) the transmission processing of the other transmission processors 118 is being carrying out. If a plurality of transmission processors 118 employs time-division to implement processing by multithreading, because they wait for their own turn to do processing, there is not absolute lack of dependency on the processing by other transmission processors 118. However, in this case as well, because processing such as to verify the progress of processing by other transmission processors 118 is not done, transmission can be said to be done "without regard to progress."

A port number can be applied to each of the transmission processors 118. The port number is included in a secondary request and is used as part of the addressee when transmitting processing results from the storage device 200. The port number is an example of identifier of one of transmission processors 118. In this manner, a transmission processor 118 appends a port number to data, and transmits the data. The secondary request is an example of a request. Secondary requests include, for example, a write request requesting write processing, a read request requesting read processing, and a delete request requesting delete processing.

The transmission processor 118 may hash the key of a record read out from the request result list 114. Hashing is an example of encoding. By hashing, fixed-length hash values (an example of second information) are obtained from a key of arbitrary length. The transmission processor 118 may perform encoding by a method other than hashing, in which case it is preferable to select a method in which there is low (or no) correlation between the similarity between keys and the similarity between encoded data.

The server 100 and the storage device 200 are connected to a communication network that enables forwarding of a secondary request including the addressee to the device of the addressee. The transmission processor 118 generates a secondary request with the hashed hash value as a part or all of the address specifying a storage device 200.

FIG. 4 shows a manner in which a secondary request is generated. As shown, the hash value generated from the key is divided into units of a pre-established number of digits and these units are treated as a storage device address, a logical address (LA), and an offset. The storage device address specifies one of the storage devices 200. The logical address (LA) is a logical address employed in the storage device 200. The offset is information specifying how many addresses after the top address of one logical address storage is to be accessed. The transmission processor 118 generates, as a secondary request, a request in which, to the addressee determined from the hash value, the request ID, the request type, the transmission source including its own port number, and data based on the value are appended. If the secondary request is not a write request, the data is omitted. The request types include write requests, read requests, and delete requests. Write requests further include, for example, a lock acquisition request, a parallel write request, a commit request, and an unlocking request.

Hashing may be performed by an element other than the transmission processor 118, in which case a hash value might be stored in the request result list 114 in place of the key.

If there is an upper limit to the number of transmission processors 118 and the number of records in the request result list 114 exceeds the upper limit, the asynchronous I/O 116 causes the processing of each record in the request result list 114 to be executed successively for each upper limit number of transmission processors 118.

Figure 5:
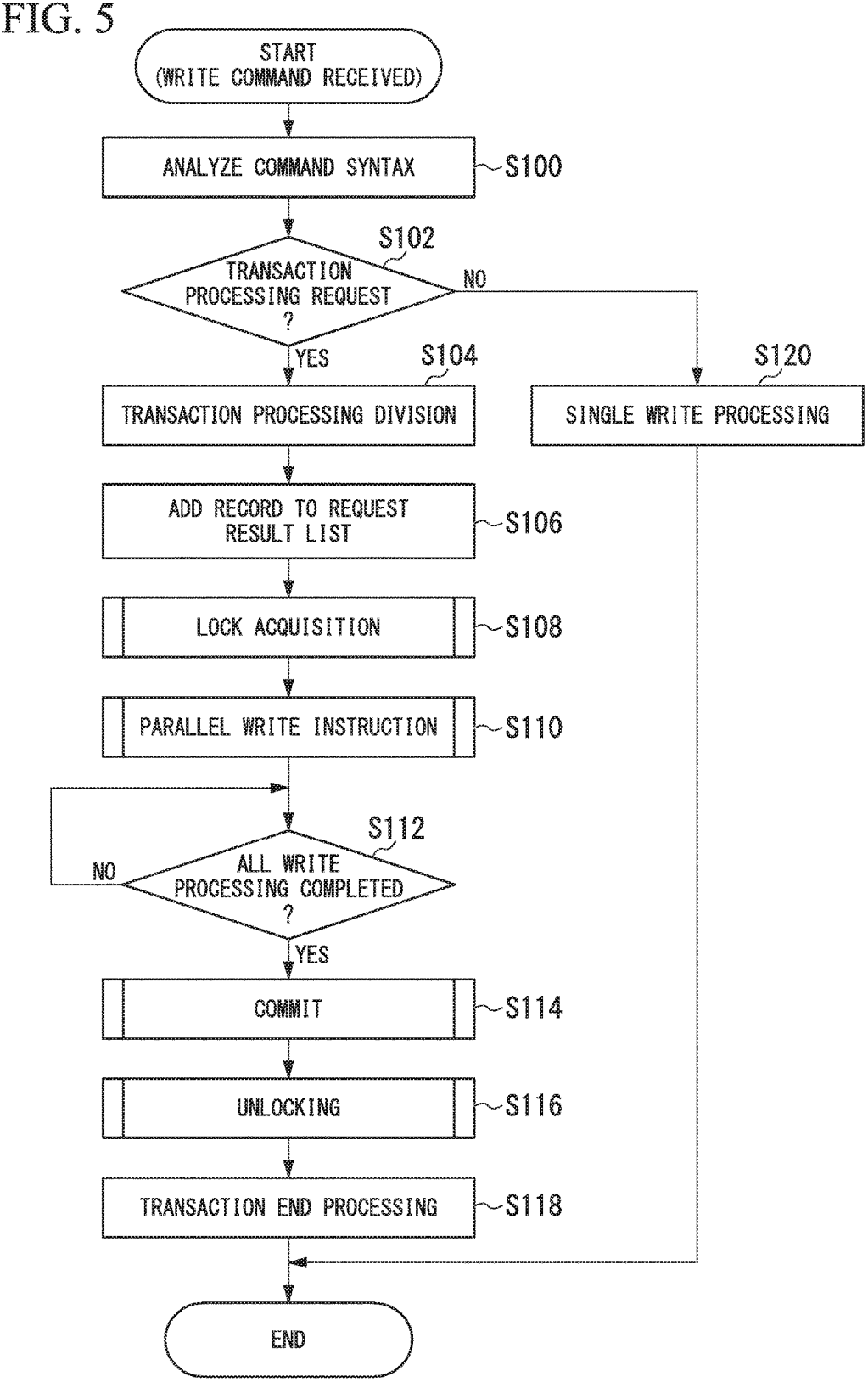
FIG. 5 is a flowchart showing an example of a flow of processing executed in the storage system.

The details of the processing by the storage system 1 will be described in more detail below. FIG. 5 is a flowchart showing an example of the flow of processing executed in the storage system. The processing of the flowchart is started when a write command is received via the client interface 102.

First, the syntax analyzer 104 analyzes the syntax of the right command (S100). Next, the execution unit 106 determines whether or not the received write command is a command requesting transaction processing (S102).

If the command requests transaction processing, the execution unit 106 passes the processing to the transaction divider 108.

First, the transaction divider 108 divides the transaction processing (S104). As described above, the transaction divider 108 starts the read/write 110 that corresponds to each of a plurality of write commands to be processed in the transaction processing.

Each of the read/writes 110 generates and provides to the request manager 112 a primary request based on the plurality of write commands. The request manager 112, based on the provided primary request, adds a record to the request result list 114 (S106).

Thereafter, the storage device 200 is accessed in a plurality of steps, such as lock acquisition, parallel write instruction, commit, and unlocking. At each step, each of the transmission processors 118, independently of the other transmission processors 118, transmits a secondary request to the corresponding storage device 200.

First, lock acquisition is carried out (S108). Lock acquisition is processing to request the storage device 200 not to execute write processing with respect to the write target address, in response to a write request from another transmission processor 118, and to acquire acknowledgement from the storage device 200. The write processing target address is identified by the above-described storage device address, logical address, and offset. If a plurality of servers 100 is provided in parallel, the other transmission processors 118 may include the transmission processors 118 of the other servers 100.

Next, a parallel writing instruction is made (S110). A parallel writing instruction refers to transmission of a write request with unique timing, without regard to whether or not write requests from the other transmission processors 118 have been completed.

When all write processing by the parallel write instruction has been completed, a commit is carried out (Yes in S112 and S114). A commit is processing of verifying that all write processing by transaction processing has been completed and permitting subsequent readout of newly rewritten data. The commit state may be managed by addition of flag information to the logical-physical conversion table in the storage device 200. The commit state may be managed by a dedicated table in the storage device 200.

Next, unlocking is performed (S116). Unlocking is processing, with regard to the write processing target address, of unlocking non-execution of write processing by a write request from the other transmission processors 118 and acquires acknowledgement from the storage device 200.

Next, transaction completion processing is done (S118), thereby ending the processing of this flowchart. In the transaction completion processing, the transaction divider 108 deletes each of records in the request result list 114 in which the "execution result" becomes "unlocked" and, when all records have been deleted, returns a response to the client 300 via the client interface 102.

If the determination made at step S102 is that the command is not a request for transaction processing, single write processing is executed (S120), in which case the execution unit 106 provides the contents of the command provided by the syntax analyzer 104 to the read/write 110.

Figure 6:
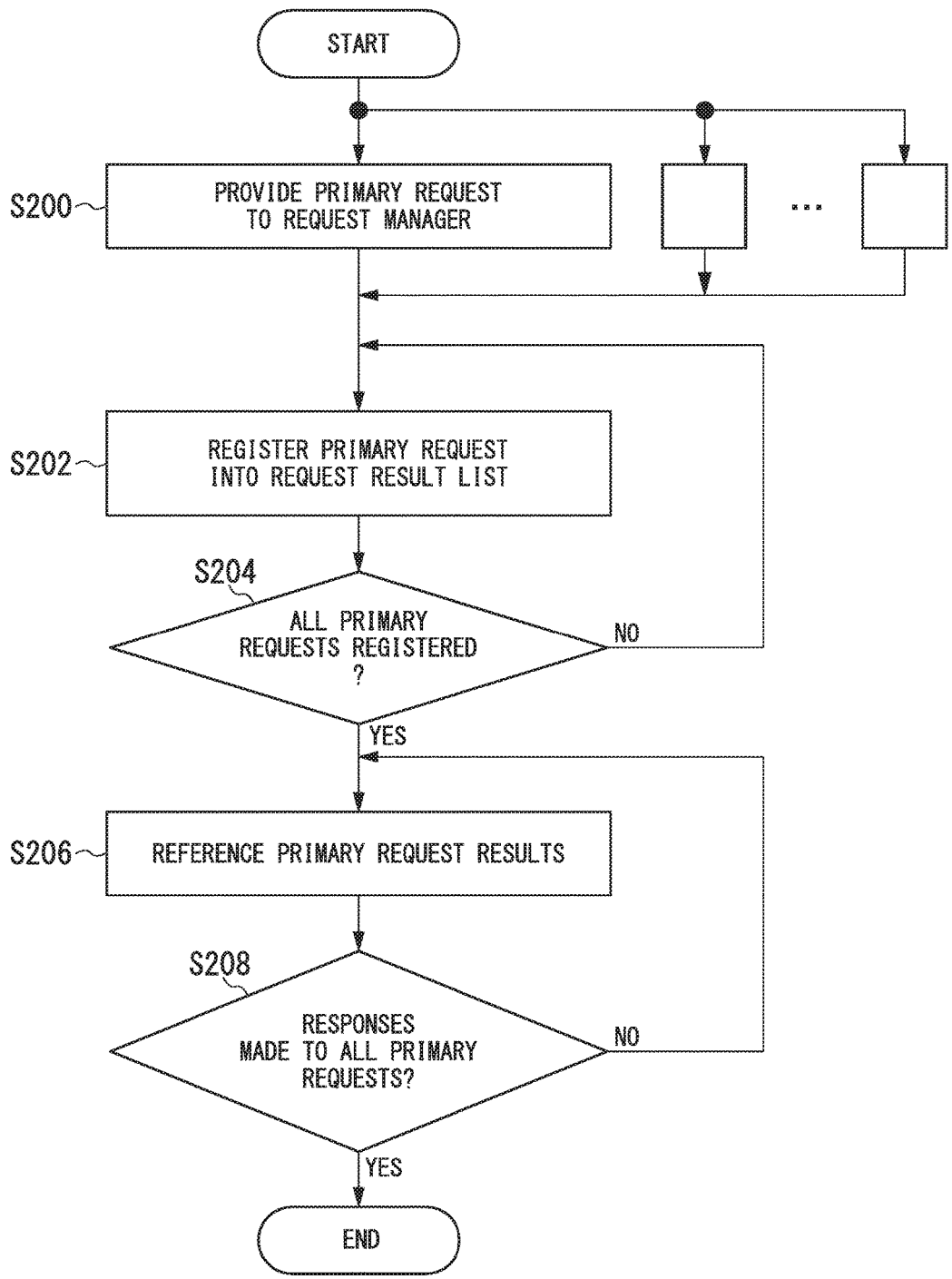
FIG. 6 shows an example of the flow of processing executed at each processing in FIG. 5.

FIG. 6 shows an example of the flow of processing executed at each step. First, each of a plurality of read/writes 110 provides a primary request to the request manager 112 (S200).

Next, the request manager 112 registers the primary request in the request result list 114 (S202).

In the lock acquisition step, which is the first step, the primary request includes a command type, arguments, and information that instructs lock acquisition. The request manager 112 generates a number of records corresponding to the number of primary requests, appends request IDs to the primary requests, and stores information indicating that lock acquisition is in progress in the execution result of the records.

Next, in parallel writing, which is the next step, the primary request may include information instructing perform parallel writing. The request manager 112 overwrites the execution result with information indicating that the parallel writing is in progress.

In the same manner, a primary request during the commit or unlocking may include information instructing commit or unlock. The request manager 112 overwrites the execution result with information indicating that commit or unlocking is in progress.

Next, the request manager 112 determines whether or not all primary requests have been registered (S204). If it is determined that all primary requests have not been registered (No in S204), processing returns to S202. If it is determined that all primary requests have been registered (Yes in S204), processing proceeds to S206.

Next, the transaction divider 108 references the primary request results, via the request manager 112 (S206).

The transaction divider 108 then determines whether or not there has been a response from the storage device 200 regarding all the primary requests (S208). The transaction divider 108 determines whether or not all of the execution results in the request result list 114 indicate that there was a response, that is, whether or not the locking in progress was overwritten with locked, parallel writing in progress was overwritten with parallel written completed, commit in progress was overwritten with commit completed, and unlocking in progress was overwritten with unlocked. If all of the execution results in the request result list 114 had been overwritten in such a manner, the transaction divider 108 determines that there were responses from the storage device 200 regarding all the primary requests and ends the processing of this flowchart.

Figure 7:
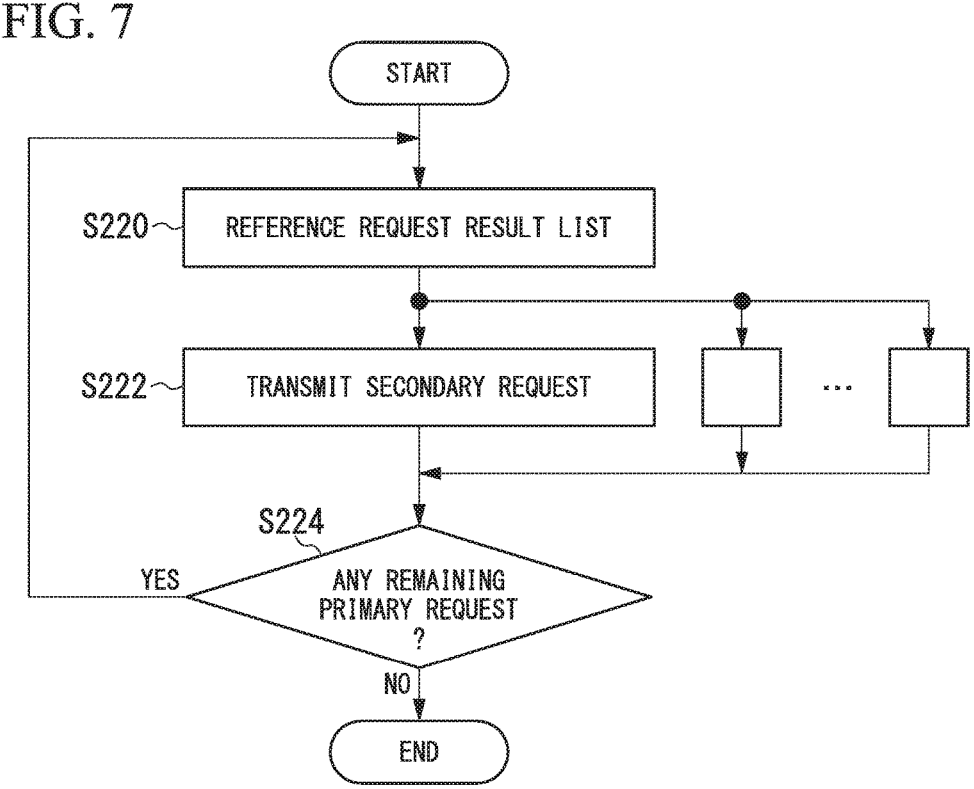
FIG. 7 is a flowchart showing an example of a flow of processing executed by a plurality of transmission processors.

FIG. 7 is a flowchart showing an example of the flow of processing executed by the plurality of transmission processors 118.

First, the asynchronous I/O 116 references the request result list 114 (S220). The asynchronous I/O 116 distributes each record of the request result list 114 to corresponding one of the plurality of transmission processors 118.

Each of the plurality of transmission processors 118 performs hashing and generates and transmits a secondary request to one of the storage devices 200 (S222).

In the case of performing transaction processing, for example, the secondary request indicates in the "Request type" item (refer to FIG. 4) that this is a write request, and include information indicating which of lock acquisition, parallel writing, commit, and unlocking is requested. In the case of parallel writing, "Data" is also included in the secondary request, and in other cases "Data" is omitted.

The asynchronous I/O 116 determines whether or not a remaining primary request exists in the request result list 114 (S224). If it is determined that a remaining primary request exists, processing returns to S220, and it is determined that if no remaining primary request exists, the processing of this flowchart ends.

Figure 8:
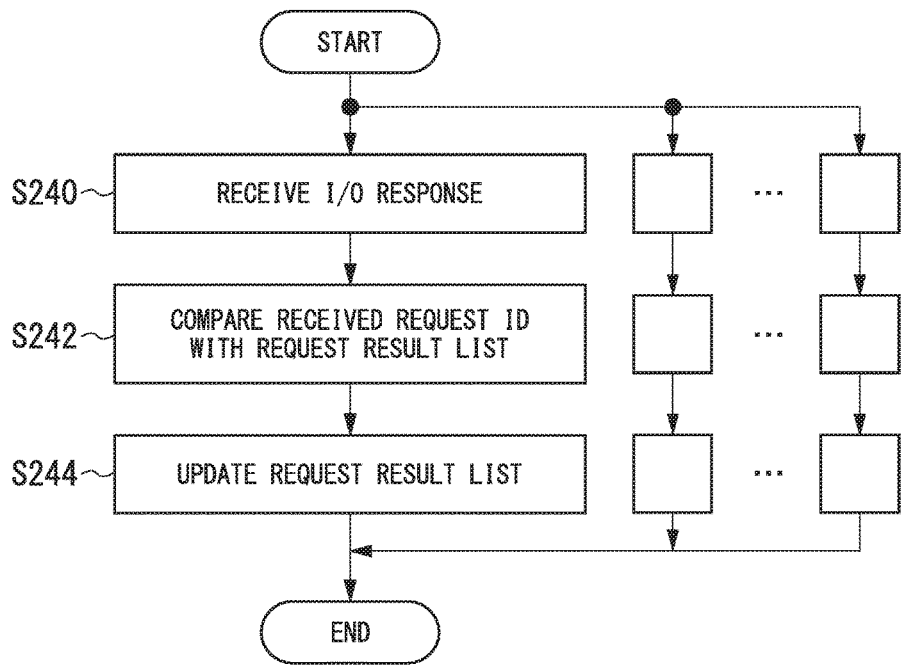
FIG. 8 is a flowchart showing an example of another flow of processing executed by a plurality of transmission processors.

FIG. 8 is a flowchart showing an example of the flow of processing executed by the plurality of transmission processors 118. The processing of this flowchart is executed repeatedly, independently of the processing of the flowchart shown in FIG. 7.

First, each of the plurality of transmission processors 118 receives a response from the storage device 200 (S240). The response from the storage device 200 includes a request ID included in the secondary request. Each of the plurality of transmission processors 118 compares the request ID included in the received response with each record in the request result list 114 (S242). Then, with respect to records having the same request IDs, each of the transmission processors 118 overwrites the execution result of locking in progress with locked, parallel writing in progress to parallel writing completed, commit in progress to commit completed, or unlocking in progress to unlocked (S244).

[Storage Device]

Figure 9:
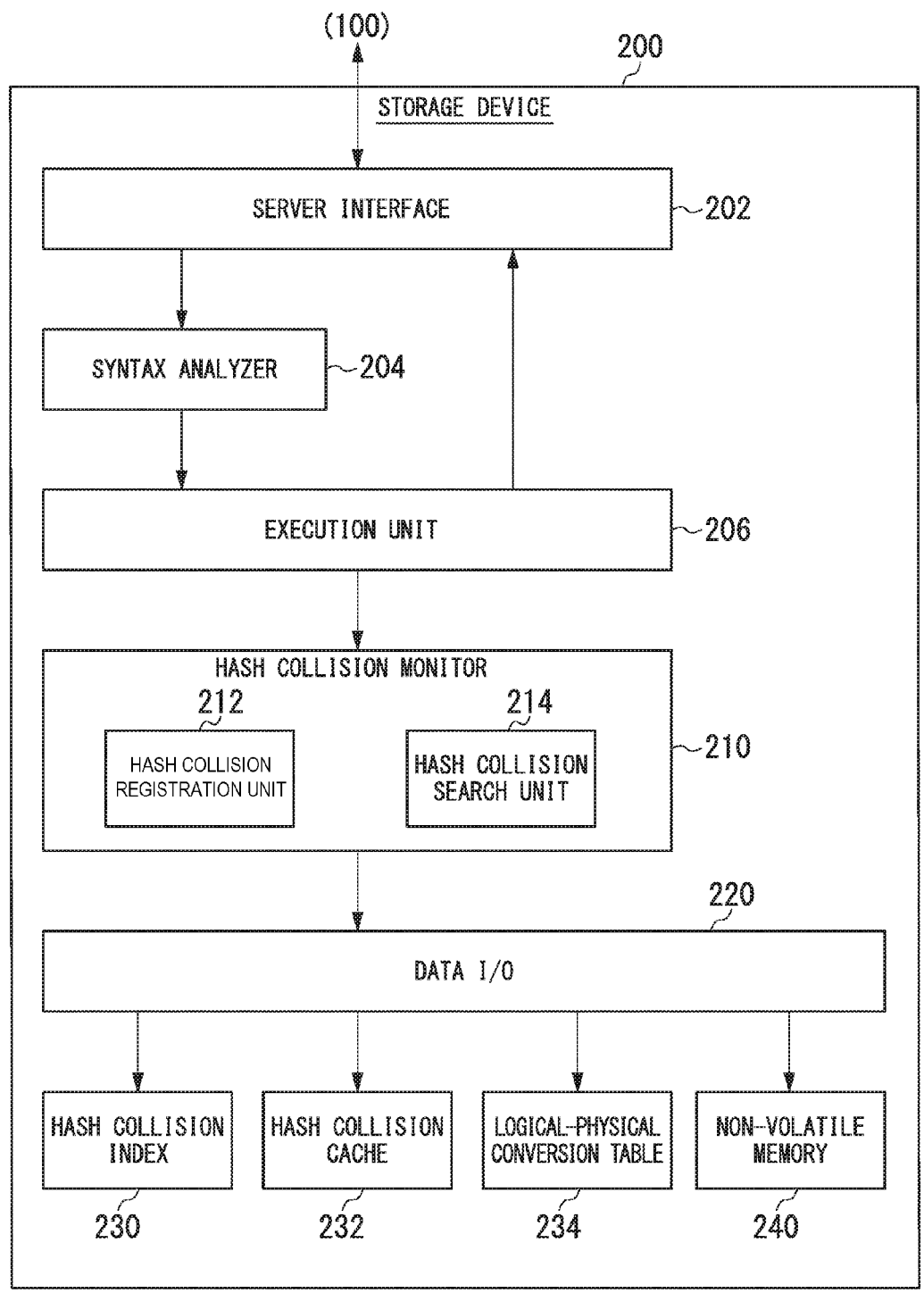
FIG. 9 shows a configuration of a storage device in the storage system.

The storage device 200 will be described below. FIG. 9 shows a configuration of the storage device 200. The storage device 200 may include a server interface 202, a syntax analyzer 204, an execution unit 206, a hash collision monitor 210, a data I/O 220, a hash collision index 230, a hash collision cache 232, a logical-physical conversion table 234, and a non-volatile memory 240, but is not restricted to these elements. The hash collision monitor 210 may include a hash collision registration unit 212 and a hash collision search unit 214, but is not restricted to these elements.

The syntax analyzer 204, the execution unit 206, and the hash collision monitor 210 may be implemented by a processor such as a CPU executing a program stored in a program memory (not shown). Of these elements, a part or all may be circuitry including hardware such as an LSI device, an ASIC, or an FPGA.

The hash collision index 230, the hash collision cache 232, and the logical-physical conversion table 234 are stored in memory such as a RAM. The non-volatile memory 240 is a NAND-type flash memory, a bit cost scalable (BiCS) memory, a magnetoresistive memory (MRAM), a phase-memory (PcRAM), or a resistive random-access memory (RRAM®), or the like.

The server interface 202 communicates with the server 100. The server interface 202 receives secondary requests from the server 100.

The syntax analyzer 204 interprets the syntax of secondary requests received via the server interface 202 and provides the results of the interpretation to the execution unit 206.

The execution unit 206, based on the results provided from the syntax analyzer 204, provides the contents of secondary requests to the hash collision monitor 210.

When the storage device 200 performs write processing and read processing, the hash collision monitor 210 monitors whether or not a hash collision occurs. A hash collision is an event, as a result of the same hash value being derived from different keys, an instruction is made to store different data into the same address (logical address and offset).

If a hash collision occurs when write processing is performed, the hash collision registration unit 212 registers information regarding the hash collision into the hash collision index 230. Data regarding write processing in which a hash collision occurred is stored into the hash collision cache 232 and the non-volatile memory 240. In this case, if there is a possibility that the address in the non-volatile memory 240 into which data regarding the write processing in which a hash collision occurred is to be stored is coexistent with a data that is already stored, the address of the addressee may be stored. If it is impossible for there to be coexistence with data that is already stored (the case in which the total data size exceeds the storage capacity of the address), the hash collision registration unit 212 stores the data at an address different from the address of the addressee.

When read processing is performed, the hash collision search unit 214 references the hash collision index 230 and, if it is determined that a hash collision has occurred, executes read processing from the hash collision cache 232.

The data I/O 220 executes data access with respect to the hash collision index 230, the hash collision cache 232, the logical-physical conversion table 234, and the non-volatile memory 240.

FIG. 10 is a flowchart showing an example of the flow of processing executed in the storage device 200. The processing of this flowchart is executed when the storage device 200 receives a write request (which, in the case of transaction processing, further includes an instruction for parallel writing).

First, the execution unit 206 instructs the hash collision monitor 210 to execute write processing (S300). The hash collision registration unit 212 of the hash collision monitor 210 determines whether or not a hash collision has occurred (S302). The hash collision registration unit 212 determines whether or not, in the logical-physical conversion table 234, there is valid data stored in a storage area (sector) of the non-volatile memory 240 indicated by the logical address and offset included in the secondary request. If it is determined that valid data is stored, the hash collision registration unit 212 determines that a hash collision has occurred, and if it is determined that valid data is not stored, the hash collision registration unit 212 determines that a hash collision has not occurred. Valid data is data that is associated with a logical address and an offset in the logical-physical conversion table 234.

If it is determined that a hash collision has not occurred (No in S322), that is, no valid data is stored, the hash collision registration unit 212, by passing an instruction to the data I/O 220 from the execution unit 206, causes the writing of data into the non-volatile memory 240 (S304).

If it is determined that a hash collision has occurred (Yes in S322), that is, valid data is stored, the hash collision registration unit 212 determines whether or not a hash collision has occurred for the first time in the sector indicated by the logical address and the offset (S306). The hash collision registration unit 212 references the hash collision index 230 and determines whether or not the hash collision is the first hash collision.

FIG. 11 shows an example of the information stored as the hash collision index 230. The hash collision index 230 stores, in association with a logical address and an offset, the number of collisions, indicating the number of times hash collisions have occurred, and sets of keys and cache addresses. A cache address is an address in the hash collision cache 232.

If a record corresponding to the logical address and the offset included in a secondary request is not registered in the hash collision index 230, the hash collision registration unit 212 determines that the hash collision is the first hash collision. If, however, a record corresponding to the logical address and the offset included in the secondary request is registered in the hash collision index 230, the hash collision registration unit 212 determines that the hash collision not the first hash collision. The record in the hash collision index 230 refers to a set of information associated with a logical address and an offset.

In the case of a first hash collision, the hash collision registration unit 212 registers anew the logical address and the offset included in the secondary request in the hash collision index 230 (S308). Then, the hash collision registration unit 212 resets the number of collisions to the initial value of zero.

Next, by sending an instruction to the data I/O 220, the hash collision registration unit 212 causes data to be stored in both the non-volatile memory 240 and the hash collision cache 232 (S310). The processing of storing data in the non-volatile memory 240 may be performed at the time the power supply to the storage system 1 is cut off When the hash collision registration unit 212 performs the processing of S310 after performing the processing of S308, the address (cache address) that had been stored in the hash collision cache 232 is stored into the Key/cache address item of the hash collision index 230, along with the key included in the "Data" of the secondary request.

The hash collision registration unit 212 then increments the number of collisions in the hash collision cache 232 by one (S312).

When the hash collision monitor 210 performs the processing of S304 or S312, the storage device 200 gives an instruction to the server interface 202 and returns a response to the server 100, which is the transmission source of the secondary request (S314). Here, the port number of the transmission processor 118 included in the secondary request is used as the addressee of the response.

FIG. 12 is a flowchart showing an example of the flow of processing executed in the storage device. The processing of this flowchart is executed when the storage device 200 receives a read request.

First, the execution unit 206 instructs the hash collision monitor 210 to execute read processing (S320). The, the hash collision search unit 214 of the hash collision monitor 210 determines whether or not the read processing is carried out with respect to data for which a hash collision has occurred (S322). The hash collision search unit 214 uses the logical address and the offset included in the secondary request to search the hash collision index 230 and, if the logical address and the offset exist, the hash collision search unit 214 determines that the read processing is carried out with respect to data for which a hash collision occurred. If, however, the logical address and the offset do not exist, the hash collision lookup unit 214 determines that the read processing is carried out with respect to data for which no hash collision has occurred.

If the hash collision search unit 214 determines that the read processing is carried out with respect to data for which a hash collision occurred, the hash collision search unit 214 reads out data from the hash collision cache 232 (S324). If, however, if the hash collision search unit 214 determines that the read processing is carried out with respect to data for which no hash collision has occurred, the hash collision search unit 214 reads out data from the non-volatile memory 240 (S326).

According to the first embodiment, the server 100 includes a manager (including the request manager 112) that stores in a memory M a part or all of data included in write commands received via a client interface 102 and a plurality of transmission processors 118 each of which reads out data stored in the memory M and transmits the read-out data to one of a plurality of storage devices 200 independently of the other transmission processors 118. For that reason, it is possible to lower latency for transmission processing and improve the responsiveness in write processing.

According to the first embodiment, a plurality of transmission processors 118 transmits secondary requests that request storing of data that are stored in the memory M through a plurality of steps, each of a plurality of storage devices 200 returns, to the transmission processor 118 that transmitted the secondary request, the result of processing carried out in accordance with the secondary request received therefrom, and the plurality of transmission processors 118 stores in the memory M the result of the processing. Only if the processing results have been stored into the memory M for all the data stored into the memory M, the secondary request for the next step is transmitted. As a result, it is possible to process each step of writing of the data in parallel step by step.

Also, according to the first embodiment, if the plurality of transmission processors 118 transmits data together with a hashed value to an addressee storage device 200 based on the hash value of the key included in a write command, each of the plurality of storage devices 200 stores data received from the transmission processor 118 into a logical address of the non-volatile memory 240 indicated by the hash value. If data having a different key are going to be stored in the same logical address, because at least one part of data having a different keys is stored into a memory that is different from the non-volatile memory, by performing processing to track the sequence the addresses of data regarding which a hash collision has occurred, it is possible to suppress delay.

Modification of First Embodiment

A modification example of the first embodiment will be described below. In the above embodiment, each record in the request result list 114 has a common request ID at steps in one transaction processing. In the present modification example, each record in the request result list 114 is deleted after the processing of one step in the transaction processing is completed, and at the next step a new record with the request ID is registered in the request result list 114A.

FIG. 13 shows an example of primary requests stored in the request result list 114A of the modification example. The command types stored in the request result list 114A are command types such as the lock acquisition command, the write command (or read command), the commit command, and the unlock command that correspond to each of the steps in the transaction processing. The execution result stored in the request result list 114A is "Not done" or "Succeeded" for each command.

Figure 14:
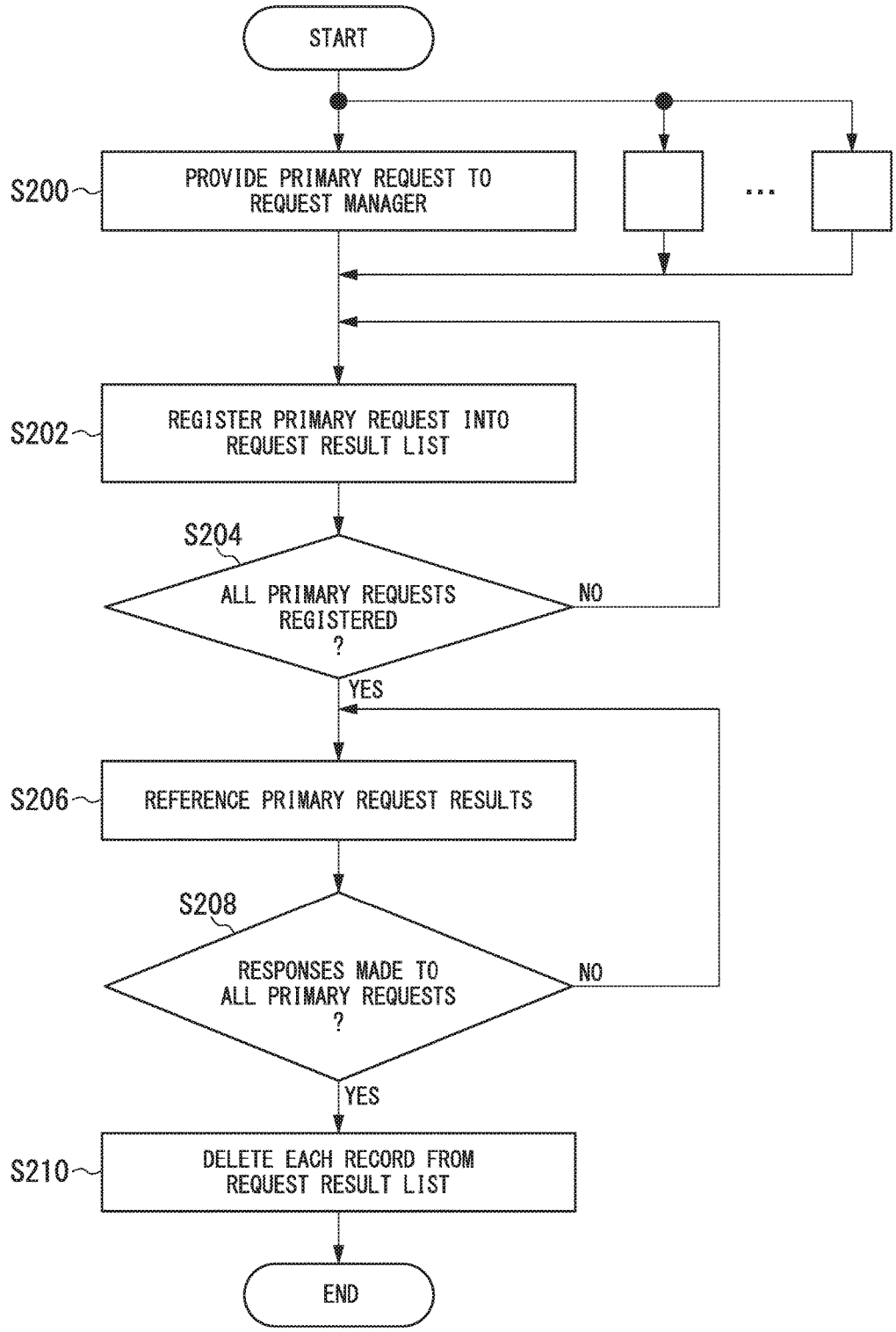
FIG. 14 shows an example of a flow of processing executed at each processing in FIG. 5, according to the modification example.

FIG. 14 shows an example of the flow of processing executed at each step according to the modification example. Because the processing at S200 to S206 in FIG. 14 is the same as the processing described in FIG. 6, the descriptions thereof will be omitted.

At S208, the transaction divider 108 determines whether or not there has been a response from the storage device 200 regarding all the primary requests (S208). The transaction divider 108 determines whether or not all the execution results in the request result list 114A are "Succeeded". If it is determined that all the execution results in the request result list 114A are "Succeeded", the transaction divider 108 determines that there was a response from the storage device 200 regarding all the primary requests, deletes each record in the request result list 114A, and ends the processing of this flowchart.

Figure 15:
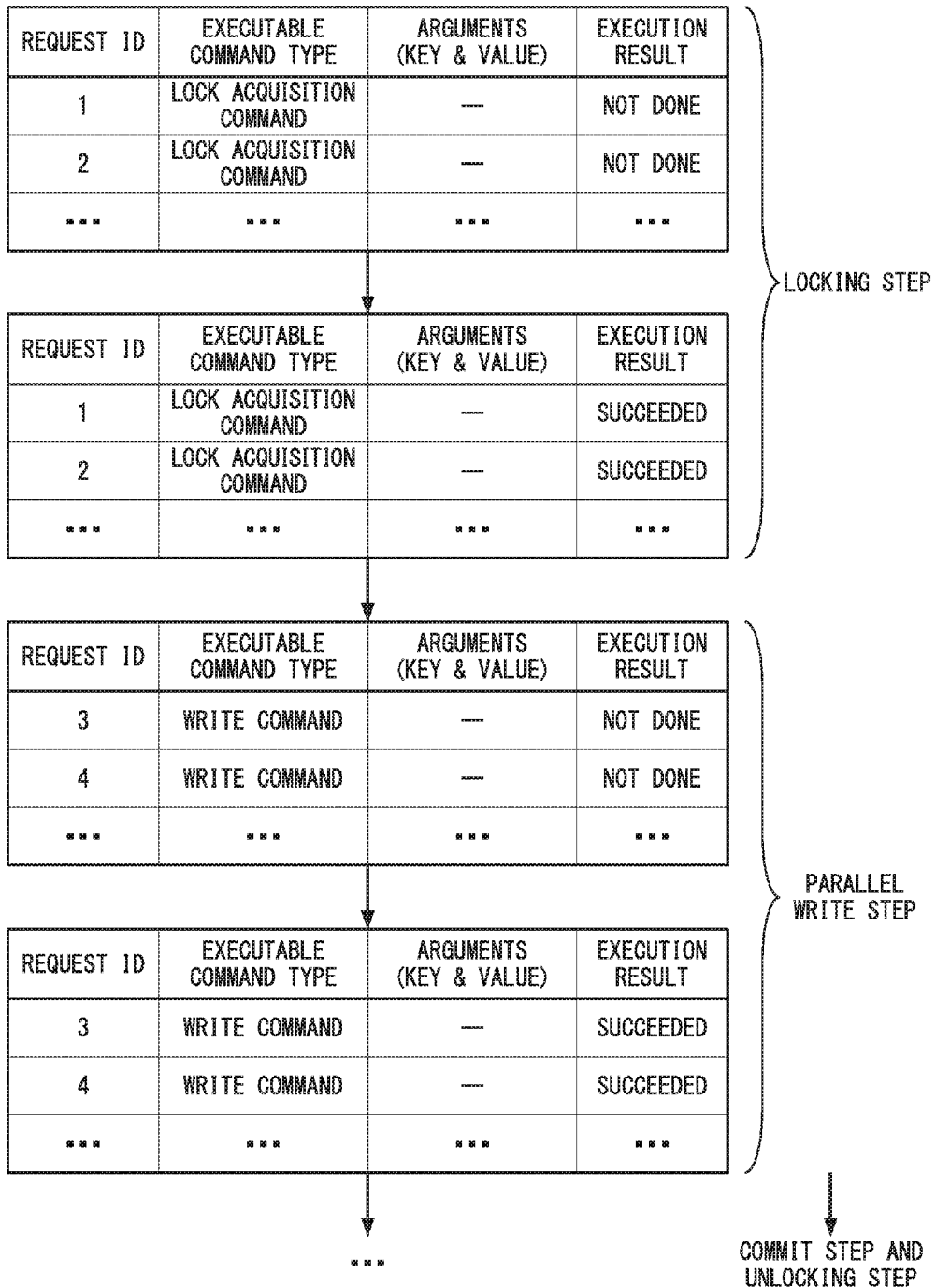
FIG. 15 shows change of contents of the request result list in the modification example.

FIG. 15 shows the change in the contents of the request result list 114A in the modification example. As shown, first, at the locking step, a record is generated with the command type as "Lock acquisition command" and the execution result as "Not yet done". When lock acquisition is completed, "Succeeded" is written into the execution result.

When all the execution results in the locking step become "Succeeded", the transaction divider 108 deletes each record and generates a record to which a new request ID is appended for the next step (parallel writing step). In this step, information indicating "Lock command" is stored in the command type.

In the same manner, when all the execution results in the parallel writing step become "Succeeded", the transaction divider 108 deletes each record. Then, the transaction divider 108 generates a record to which a new request ID is appended for the next step (commit step). In this manner, records are successively created with newly appended request IDs for each step.

Second Embodiment

A second embodiment will be described below. A storage system according to the second embodiment implements the elements of the storage system described in the first embodiment using the hardware elements described below. In the following description, only the client 300 has applied thereto the same reference symbol as in the first embodiment.

[Overall Configuration]

Figure 16:
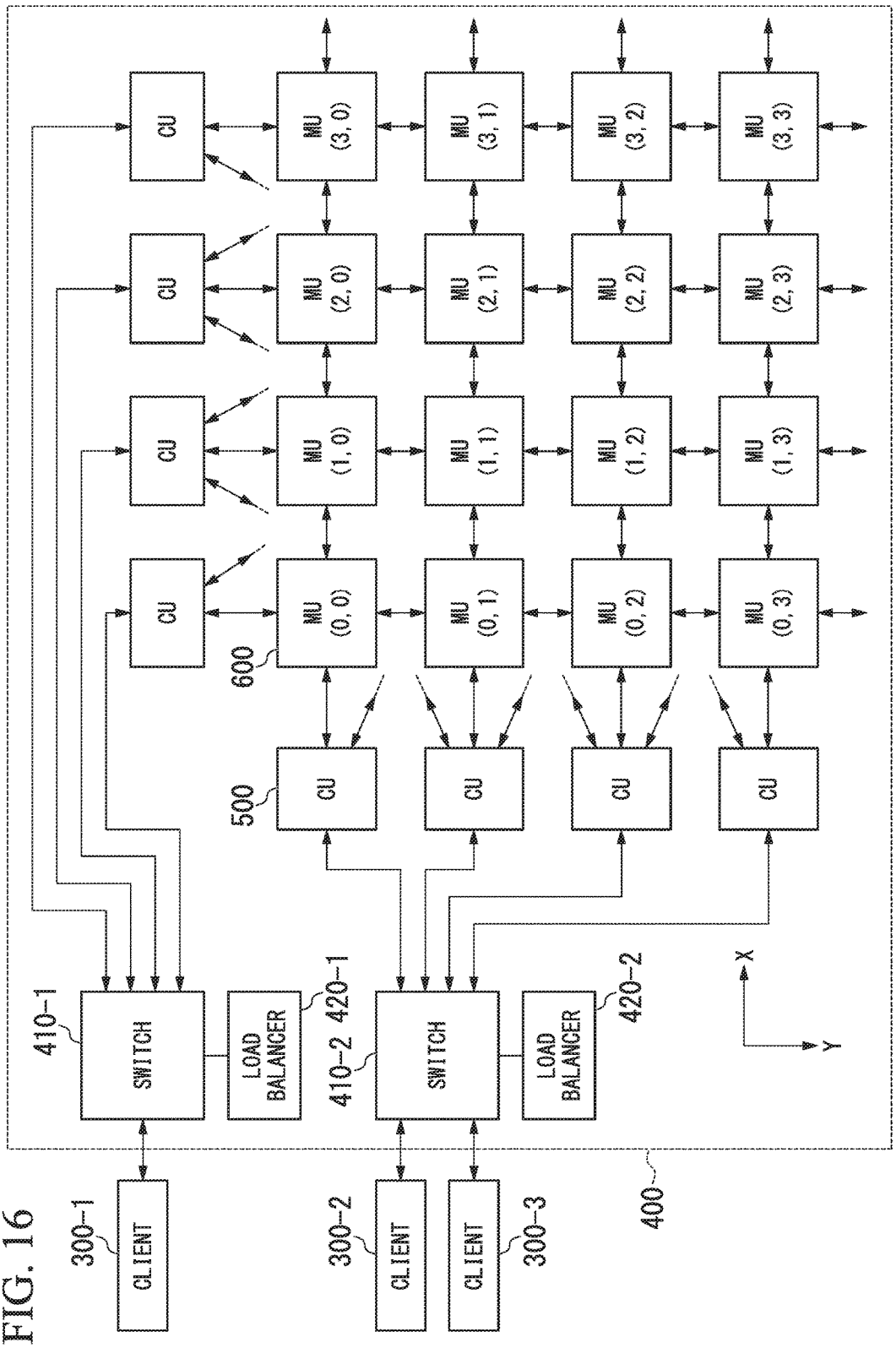
FIG. 16 shows a configuration of a storage system according to a second embodiment.

FIG. 16 shows a configuration of a storage system 400 according to the second embodiment. The storage system 400 may include switches 410-1 and 410-2, load balancers 420-1 and 420-2, a plurality of connection units (CUs) 500, and a plurality of memory units (MUs) 600, although it is not restricted to these elements.

One or more clients 300 (shown as 300-1 in the drawing) are connected to the switch 410-1. The client 300-1 transmits commands to the switch 410-1 in the same manner as in the first embodiment. The load balancer 420-1 monitors the processing loads on each connection unit 500, and the switch 410-1 switches the connection units 500 to which a command is transferred so as to smooth the load.

One or more clients 300 (300-2 and 300-3 in the drawing) are connected to the switch 410-2. The clients 300-2 and 300-3 transmit to the switch 410-2 commands in the same manner as in the first embodiment. The load balancer 420-2 monitors the processing loads on each connection unit 500, and the switch 410-2 switches the connection units 500 to which a command is transferred so as to smooth the load.

A connection unit 500 has a function the same as the server 100 in the first embodiment. A memory unit 600 has a function the same as the storage device 200 in the first embodiment.

A connection unit 500 (connection device, command receiver, command receiving device, response unit, response device) receives commands from one or more clients 300, transfers packets to a memory unit 600, and, based on the results of packet processing returned from the memory unit 600, returns a response to the client 300. A packet corresponds to the secondary request in the first embodiment.

The memory unit 600 includes a non-volatile memory and stores data requested by a command from a client 300. The memory unit 600 is a memory unit (memory module, memory with a communication function, communication device with a memory function, memory communication unit) that transmits (transfers) data to an addressee memory unit 600 via a communication network connected between memory units 600.

FIG. 16 shows an example of a rectangular network in which memory units 600 are disposed at matrix points. In this case, the coordinates of a matrix point are indicated as decimal-notation coordinates (x, y). Position information of a memory unit 600 disposed at a matrix point is indicated by a relative node address ($x_D$, $y_D$) (in decimal notation) corresponding to the coordinates of the matrix point. In FIG. 16, the memory unit 600 located in the upper-left corner has the origin node address of (0, 0). The relative node addresses of each of the memory units 600 increase and decrease according to the change in the integer values in the horizontal direction (X direction) and the vertical direction (Y direction).

Each memory unit 600 is connected to neighboring memory units 600 in at least two different directions. For example, the memory unit 600 (0, 0) in the most upper-left corner is connected to the memory unit 600 (1, 0) neighboring in X direction and to the memory unit 600 (0, 1) neighboring in Y direction.

[Connection Unit]

Figure 17:
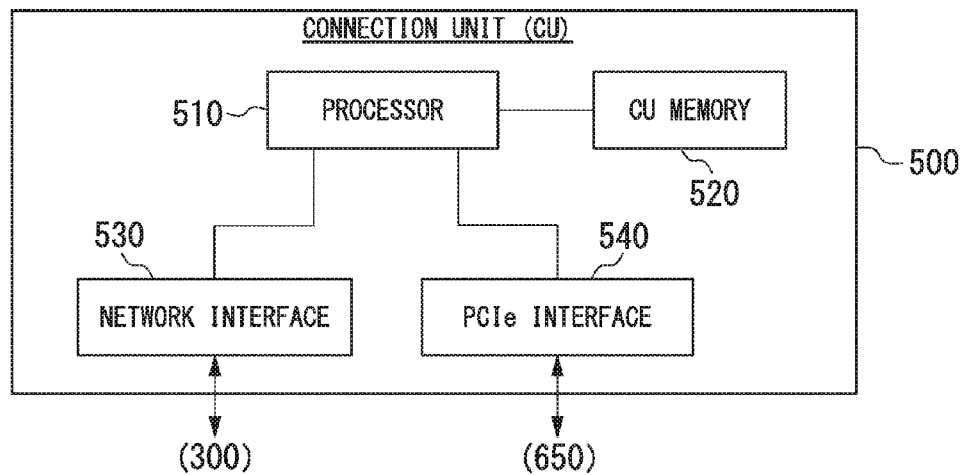
FIG. 17 shows an example of a connection unit (CU) in the storage system according to the second embodiment.

FIG. 17 shows an example of the connection unit 500. The connection unit 500 may include a processor 510 such as a CPU, a CU memory 520, a network interface 530, and a PCIe interface 540, although it is not restricted to these elements. The processor 510 performs various processing by executing application programs, using the CU memory 520 as a working area.

The CU memory 520 is, for example, a RAM, although it is not restricted to that. Various type of memory can be used for the CU memory 520. The network interface 530 is an interface that is connectable to a client 300. The PCIe interface 540 connects to the routing circuit 620 (described later) of a memory unit 600. The connection unit 500 may include a plurality of PCIe interfaces 540 that is connectable to routing circuits 620 of a plurality of memory units 600.

The network interface 530 corresponds to the client interface 102 in the first embodiment. The processor 510 of the connection unit 500, by executing an application program, executes the same type of processing as the syntax analyzer 104, the execution unit 106, the transaction divider 108, the read/write 110, the request manager 112, the asynchronous I/O 116, and the plurality of transmission processors 118. The CU memory 520 stores information corresponding to the request result list 114.

[Memory Unit]

Figure 18:
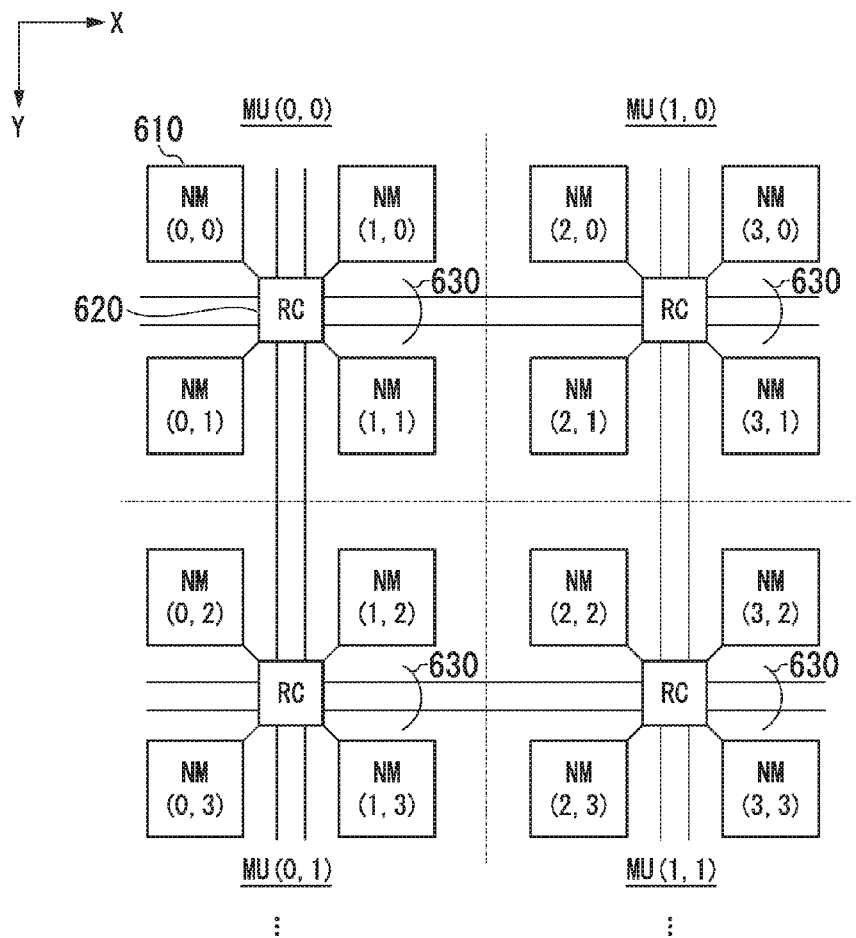
FIG. 18 shows an example of a memory unit (MU) in the storage system according to the second embodiment.

FIG. 18 shows an example of the memory unit 600. The memory unit 600 may be configured as an FPGA, although it is not restricted thereto. In FIG. 18, four memory units 600 are shown. For example, the memory unit 600 (0, 0) includes one routing circuit 620 and the four node modules 610 (0, 0), (1, 0), (0, 1), and (1, 1).

The addresses (FPGA addresses) of each of the four memory units 600 are expressed, for example, in binary notation as (000, 000), (010, 000), (000, 010), and (010, 010).

The routing circuit 620 and the four node modules 620 of each memory unit 600 are electrically connected via a routing circuit interface 630 and a package management unit 640, which will be described below. In data transfer operation, the routing circuit 620 references the addressee x and the addressee y of the FPGA address to perform routing.

Figure 19:
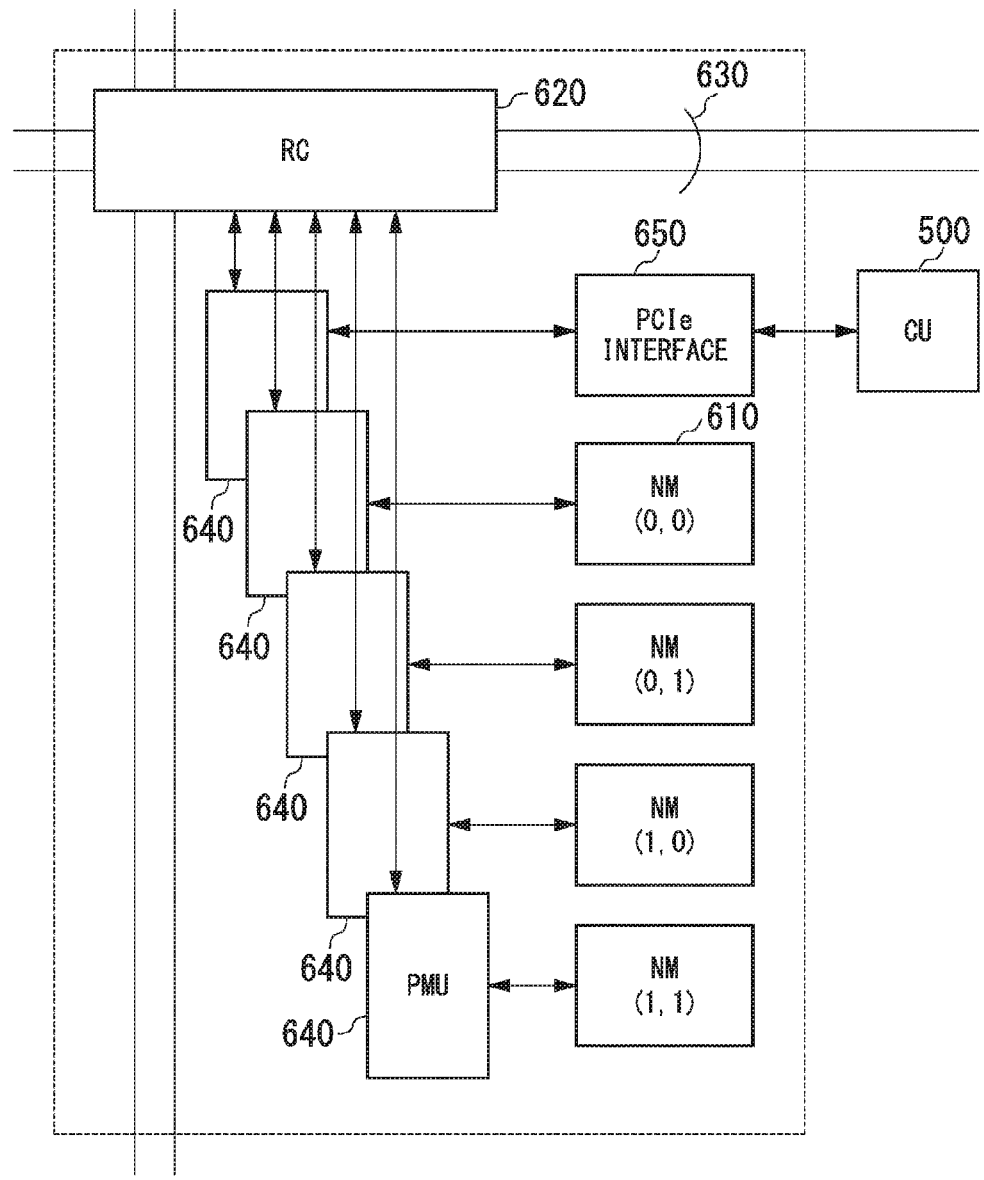
FIG. 19 shows an example of an internal configuration of the memory unit.

FIG. 19 shows an example of an internal configuration of the memory unit 600. The memory unit 600 may include four node modules 610, one routing circuit 620, five packet management units 640, and one PCIe interface 650, although it is not restricted to these elements.

Four packet management units 640 corresponding to the four node modules 610 analyze packets transmitted by the memory units 600 and the routing circuits 620. Each of the four packet management units 640 determines whether or not the coordinates included in a packet (relative node address) are its own (relative node address). If the coordinates coded in a packet coincide with its own coordinates, the packet management unit 640 transmits the packet directly to the node module 610 corresponding to the coordinates. If, however, the coordinates coded in the packet do not coincide with its own coordinates (the case in which they are other coordinates), the packet management unit 640 returns to the routing circuit 620 that information.

For example, if the node address (node module 610 address) of the ultimate target position is (3, 3), the packet management unit 640 connected to the node address (3, 3) determines that the coordinates (3, 3) coded in the analyzed packet coincide with its own coordinates (3, 3). For this reason, the packet management unit 640 connected to the node address (3, 3) transmits the analyzed packet to the node module 610 of the node address (3, 3) connected thereto. The transmitted packet is analyzed by a node controller 612 (described later) of the node module 610. By the node controller 612, the memory unit 600 causes processing in accordance with the request included in the packet, such as storing data into a non-volatile memory in the node module 610.

The PCIe interface 650 transmits, to the packet management unit 640 corresponding thereto, requests, packets, and the like from the connection unit 500. The packet management unit 640 analyzes the packets. A packet transmitted to the packet management unit 640 corresponding to the PCIe interface 650 is transferred to another node module 610 via the routing circuit 620.

[Node Module]

Figure 20:
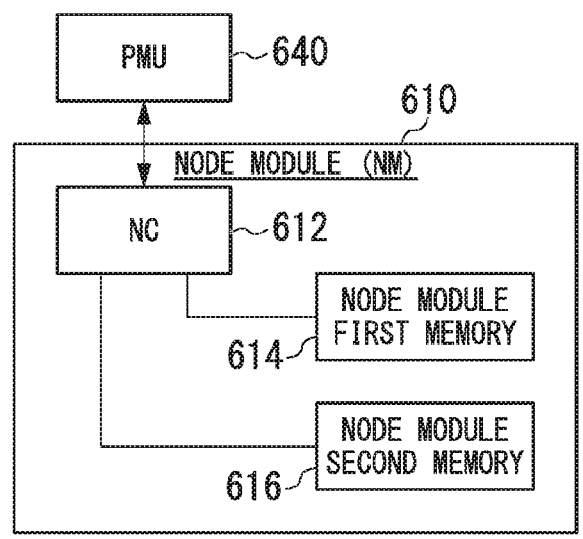
FIG. 20 shows an example of a node module (NM) in the storage system according to the second embodiment.

The node module (NM) 610 of the embodiment will be described below. FIG. 20 shows an example of the node module 610.

The node module 610 includes a node controller (NC) 612, an NM first memory 614 functioning as a storage memory, and NM second memory 616 used as a working area by the node controller 612, although it is not restricted to these elements.

The packet management unit 640 is electrically connected to a node controller 612. The node controller 612 receives packets via the packet management unit 640 from the connection unit 500 or another node module 610, and transmits packets via the packet management unit 640 to the connection unit 500 or another node module 610. If the addressee of a packet is its own node module 610, the node controller 612 executes processing in accordance with that packet (a request recorded in that packet). A request corresponds to a secondary request in the first embodiment. For example, if a request is an access request (read request or write request), the node controller 612 executes access of the NM first memory 614. If the addressee of the received packet is not the node module 610 corresponding to itself, the routing circuit 620 transfers that packet to another routing circuit 620.

A non-volatile memory such as, for example, a NAND-type flash memory, a bit cost scalable (BiCS) memory, a magnetoresistive memory (MRAM) a phase-change memory (PcRAM), or a resistive random-access memory (RRAM; registered trademark), or the like, or a combination thereof, can be used for the NM first memory 614.

Various types of RAM, such as DRAM (dynamic random-access memory) can be used for the NM second memory 616. If the NM first memory 614 provides the function of a working area, the NM second memory 616 need not be disposed in the node module 610.

In this manner, in the present embodiment, a communication network is formed among the node modules 610 by each routing circuit 620 being connected by a routing circuit interface 630, and the routing circuit 620 and each node module 610 being connected by the packet management unit 640, although there is no restriction to this. For example, the communication network may be formed by each node module 610 being connected directly, without an intervening routing circuit 620.

The packet management unit 640 corresponds to the server interface 202 in the first embodiment.

The node controller 612 may include one or more processors. The processor, by executing a program, executes processing that is the same as the syntax analyzer 204, the execution unit 206, the hash collision monitor 210, and the data I/O 220 in the first embodiment.

The NM first memory 614 corresponds to the non-volatile memory 240 in the first embodiment.

Information corresponding to the hash collision index 230, the hash collision cache 232, and the logical-physical conversion table 234 of the first embodiment is stored in the NM second memory 616.

[Interface Standards]

The interface standards in the storage system of the present embodiment will be described below. In the present embodiment, an interface that electrically connects the above-described elements of the storage system can be one of the standards described below.

A low-voltage differential signaling standard (LVDS) or the like can be used for the routing circuit interface 630 that is connectable to each routing circuit 620.

The PCIe (PCI Express) standard or the like can be used for the routing circuit interface 630 that is electrically connectable to the routing circuits 620 and the connection units 500.

These interface standards are exemplary, and other interface standards may be used as required.

[Packet Configuration]

Figure 21:
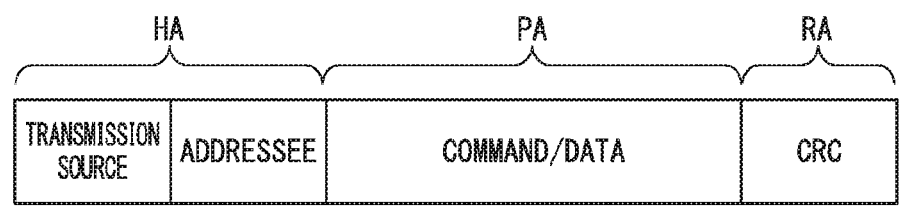
FIG. 21 shows contents of a packet according to the second embodiment.

FIG. 21 shows an example of a packet. A packet transmitted in the storage system 400 of the present embodiment includes a header area HA, a payload area PA, and a redundancy area RA.

The head area HA includes, for example, the address of the transmission source and the address of the transmission destination.

The payload area PA includes, for example, a command and data. The data size of the payload area PA is variable. A command corresponds to the request type in the first embodiment.

The redundancy area RA includes, for example, a CRC (cyclic redundancy check) code. The CRC code is a code (information) used for detecting errors in the payload area PA data.

A routing circuit 620 that has received a packet of the above-described configuration determines the routing destination, based on a prescribed transfer algorithm. Based on the transfer algorithm, the packet is transferred among the routing circuits 620 and ultimately reaches the node module 610 having the node address that is the final target destination.

For example, the routing circuit 620, based on the above-noted transfer algorithm, determines as the transfer destination node module 610 a node module 610 on the path that has the minimum number of transfers from its own node module 610 to the addressee node module 610. If, based on the above-noted transfer algorithm, a plurality of paths having the minimum number of transfers from its own node module 610 to the addressee node module 610 exists, the routing circuit 620 selects one of the plurality of paths, using an arbitrary method. In the same manner, if there is a node module 610 connected to its own node module 610 on the path that has the minimum number of transfers that has a fault or is busy, the routing circuit 620 determines a different node module 610 as the transfer destination.

By logically connecting a plurality of node modules 610 in a mesh network, a plurality of paths having the minimum number of packet transfers might exist, in which case even if a plurality of packets having a specific node module 610 as a destination is output, the output plurality of packets is distributed among a plurality of paths by the above-described transfer algorithm.

Figure 22:
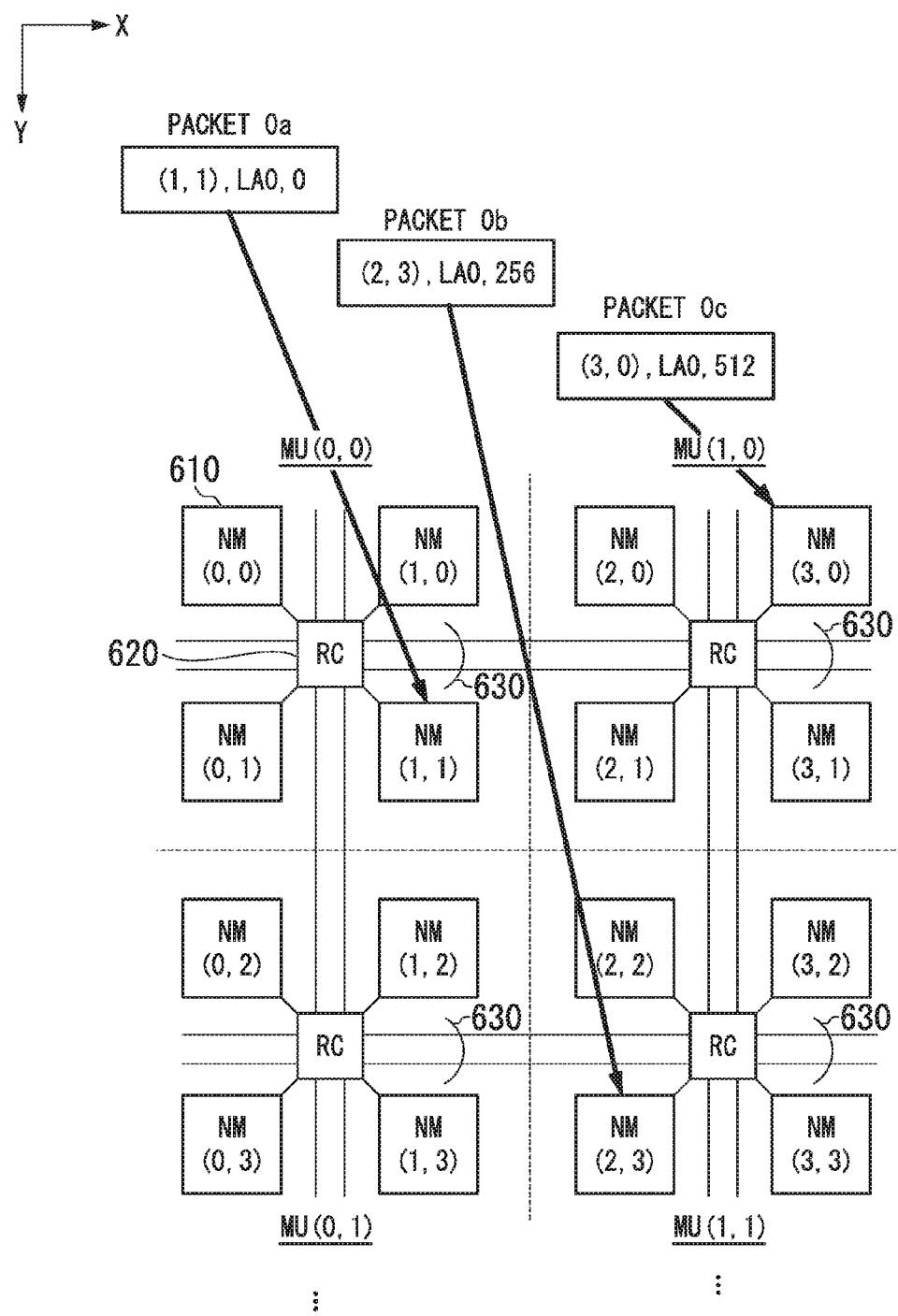
FIG. 22 shows transmission of three packets to node modules by transaction processing, according to the second embodiment.

FIG. 22 shows transmission of three packets to node modules 610 by the transaction processing. As shown in FIG. 22, a packet 0a specifying the node module address (storage device address), the logical address, and the offset as (1, 1), 0, 0 is delivered to the node module 610 (1, 1). A packet 0b specifying the node module address, the logical address, and the offset as (2, 3), 0, 256 is delivered to the node module 610 (2, 3). A packet 0c specifying the node module address, the logical address, and the offset as (3, 0), 0, 512 is delivered to the node module 610 (3, 0).

Figure 23:
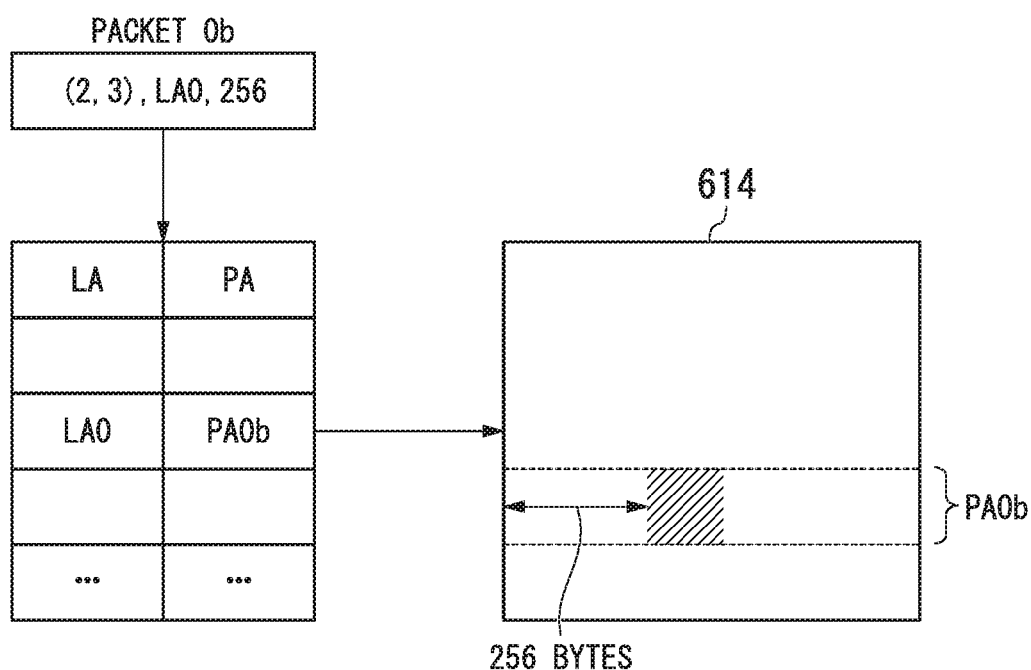
FIG. 23 shows writing of data included in a packet in a node module first memory, according to the second embodiment.

FIG. 23 shows writing of the data included in a packet into a node module first memory 614. In FIG. 23, after the packet 0b specifying the node module address, the logical address, and the offset as (2, 3), 0, 256 is delivered to the node module 610 (2, 3), the node controller 612 converts the logical address LA0 physical address PA0b. The data is then stored at an address that is 256 bytes after the top address in the physical address PA0b area in the NM first memory 614.

Third Embodiment

A third embodiment will be described below. A storage system according to the third embodiment implements the elements of the storage system according to the first embodiment using the hardware elements described below. In the following description, only the client 300 has applied thereto the same reference symbol as in the first embodiment.

[Overall Configuration]

Figure 24:
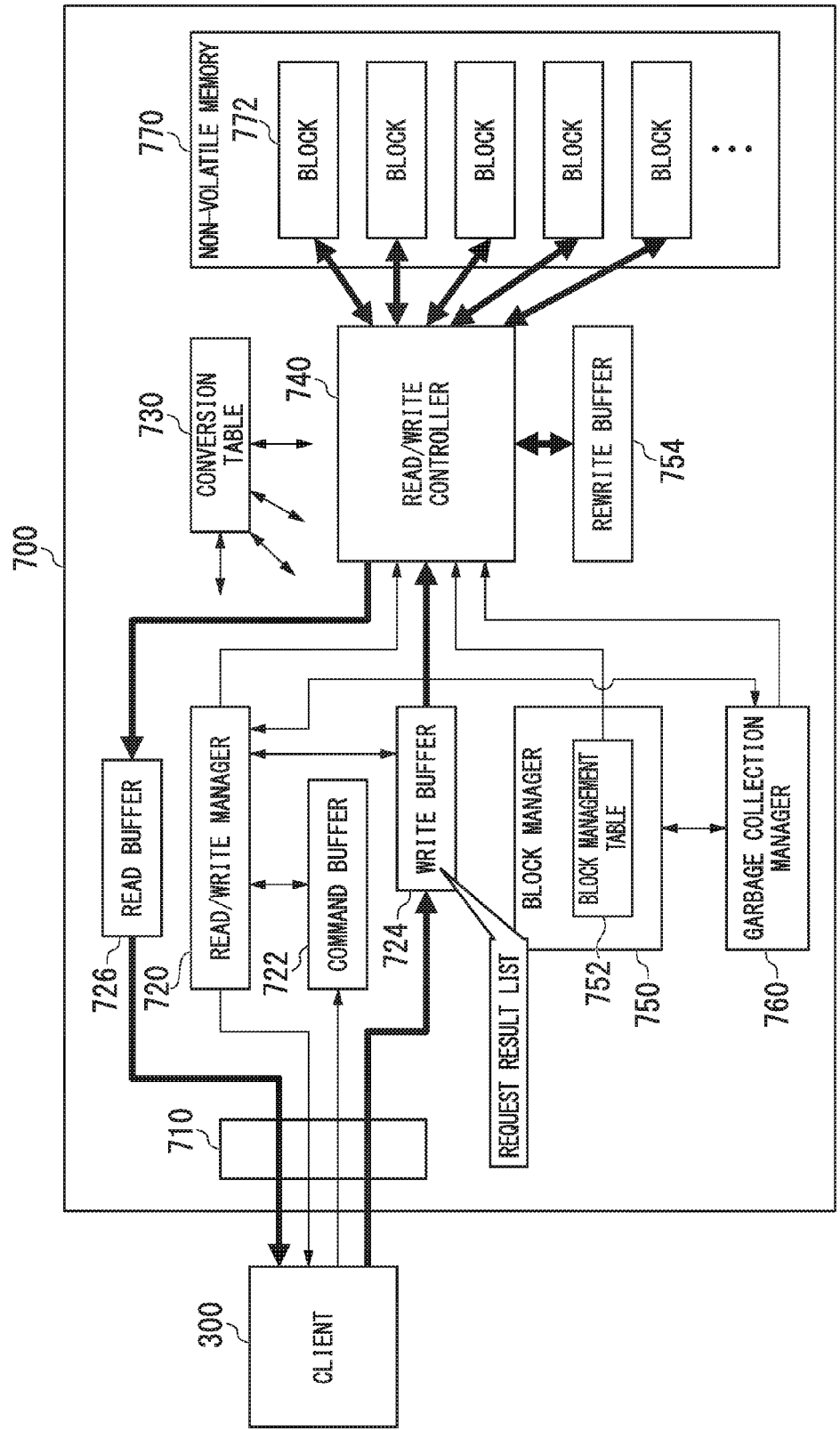
FIG. 24 shows a configuration of a storage system according to a third embodiment.

FIG. 24 shows a configuration of a storage system 700 according to the third embodiment. The storage system 700 has a client interface 710, a read/write manager 720, a command buffer 722, a write buffer 724, a read buffer 726, a conversion table 730, a read/write controller 740, a block manager 750, a block management table 752, a rewrite buffer 754, a garbage (GC) manager 760, and a non-volatile memory 770, although there is no restriction to these elements.

The read/write manager 720, the read/write controller 740, the block manager 750, and the garbage collection manager 760 are implemented by hardware such as an LSI device, an ASIC, an FPGA, or a PLC, and may have a circuit constitution for implementing each of the functions thereof. A part or all of the read/write manager 720, the read/write controller 740, the block manager 750, and the garbage collection manager 760 may be implemented by a processor such as a CPU executing a program.

The command buffer 722, the write buffer 724, the read buffer 726, the conversion table 730, and the block management table 752 are stored in memory such as a RAM. The conversion table 730, the block management table 752, and the access frequency management table 762 are stored into the non-volatile memory 770 at the time the power supply to the storage system 700 is cut off, and read out from the non-volatile memory 770 the next time the power is switched on and positioned into a volatile memory.

The read/write manager 720 instructs the read/write controller 740 to write data into the non-volatile memory 770 based on write commands received from the client 300, and to read out data from the non-volatile memory 770 based on read commands received from the client 300.

A command received from the client 300 is stored in the command buffer 722. If a write command is stored in the command buffer 722, the read/write manager 720 determines a writing area in the write buffer 724 and transmits a data transmission request to the client 300. Upon receiving the data transmission request, the client 300 transmits the data for which the write request was made (hereinafter, write data) to the storage system 700. The storage system 700 stores the write data received from the client 300 into the write buffer 724. The read/write manager 720 instructs the read/write controller 740 to write the data that had been stored in the write buffer 724 into the physical address in the non-volatile memory 770 corresponding to the key appended to the write command. Rather than acquiring the write data in this manner, the storage system 700 may receive a command to which the data is appended.

In contrast, if a read command has been stored in the command buffer 722, the read/write manager 720 instructs the read/write controller 740 to read out the data from the physical address in the non-volatile memory 770 corresponding to the key appended to the read command and write the data into the read buffer 726.

If a plurality of commands is received from the client 300 as transaction processing, the read/write manager 720 executes processing to the same as the syntax analyzer 104, the execution unit 106, the transaction divider 108, the read/write 110, and the request manager 112 of the first embodiment. Information corresponding to the request result list 114 is stored in the write buffer 724. The read/write manager 720 generates a primary request and stores the primary request in the write buffer 724.

The read/write controller 740 includes, for example, an interface circuit that is an interface with the non-volatile memory 770, an error correction circuit, and a DMA controller. The read/write controller 740 writes data that had been stored into the write buffer 724 into the non-volatile memory 770, and reads out data stored in the non-volatile memory 770 and writes it into the read buffer 726.

If information corresponding to the request result list 114 is stored in the write buffer 724, the read/write controller 740 executes processing the same as the asynchronous I/O 116 and the plurality of transmission processors 118 in the first embodiment. That is, read/write controller 740 generates a secondary request with a hashed key as the addressee and transmits data to the non-volatile memory 770 of the addressee.

The block manager 750 includes a block management table 752.

The non-volatile memory 770 may be a NAND memory, although it is not restricted thereto. The non-volatile memory 770 includes a plurality of blocks 772, which are the unit of data deletion. The block manager 750 manages the states of each block 772. The writing of data in the non-volatile memory 770 is carried out in units of clusters. The cluster may be the same size as a page in the NAND memory, or may be a different size.

According to at least one of the above-described embodiments, a storage system has a manager that causes storage of a part or all of data associated with a write command received via a client interface 102 into the memory M, and a transmission processor 118 that reads out data that had been stored in the memory M and writes the read-out data into one of a plurality of storage devices 200, independently of the other transmission processors 118. As a result, it is possible to lower latency for transmission processing and to improve the responsiveness in write processing.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A storage system comprising:
    a plurality of storage devices; and
    a server including a memory and an interface, the server being configured to
        store, in the memory, each of data pieces that are received through the interface from a client as a series of data to be written, in association with a single write command or a series of write commands received through the interface from the client,
        for each data piece, determine a target storage device and a logical address thereof at which the data piece is to be written, based on an identifier of the data piece received in association with the data piece through the interface from the client, and
        carry out, in parallel, writing of the data pieces stored in the memory at the determined logical addresses.

2. The storage system according to claim 1, wherein
    the server includes one or more processors on which transmission processors are executed in a time-divided manner, and
    each of the transmission processors transmits to a target storage device, a request to write one of the data pieces at a corresponding logical address.

3. The storage system according to claim 1, wherein
    the server further includes a plurality of processing circuits operable in parallel, each of the processing circuits communicating with a target storage device to write one of the data pieces at a corresponding logical address.

4. The storage system according to claim 1, wherein the writing of the data pieces in parallel is carried out over a plurality of steps and the server proceeds to a next step only upon completion of a current step for all of the data pieces.

5. The storage system according to claim 4, wherein
    the server is further configured to store, in the memory, a progress state of the writing for each of the data pieces, and proceeds to the next step with reference to the progress states.

6. The storage system according to claim 5, wherein
    the server is further configured to transmit, in each step and for each data piece, a request to cause the corresponding target storage device to be in a predetermined operation state, and update the progress state for the data piece upon receiving an acknowledgement from the corresponding target storage device.

7. The storage system according to claim 6, wherein for each data piece, the server transmits a lock request to cause a corresponding target storage device to deny writing of another data piece at the corresponding logical address, a commit request to write the data piece at the corresponding logical address, and an unlock request to cause the corresponding target storage device to allow writing of another data piece at the corresponding logical address.

8. The storage system according to claim 1, wherein for each of the data pieces, the server encodes the identifier of the data piece, and determines the target storage device based on a first portion of the encoded identifier and the logical address thereof based on a second portion of the encoded identifier.

9. The storage system according to claim 8, wherein for each of the data pieces, the server calculates a hash value of the identifier of the data piece as the encoded identifier.

10. The storage system according to claim 9, wherein when the hash values of two or more data pieces are the same, the target storage device writes the two or more data pieces at different physical locations thereof.

11. The storage system according to claim 10, wherein at least one of the two or more data pieces is written in a cache memory of the target storage device.

12. The storage system according to claim 10, wherein when the first storage device detects that the hash values of two or more data pieces are the same, the first storage device increments a conflicts counter stored in a memory thereof.

13. A method of operating a storage system including a plurality of storage devices and a server, comprising:
    storing, in a memory of the server, each of data pieces that are received from a client as a series of data to be written, in association with a single write command or a series of write commands received from the client,
    for each data piece, determining a target storage device and a logical address thereof at which the data piece is to be written, based on an identifier of the data piece received in association with the data piece from the client; and
    carrying out, in parallel, writing of the data pieces stored in the memory at the determined logical addresses.

14. The method according to claim 13, further comprising:
    executing on one or more processors in the server, a plurality of transmission processors in a time-divided manner; and
    transmitting, by each of the transmission processors, to a target storage device, a request to write one of the data pieces at a corresponding logical address.

15. The method according to claim 13, wherein the writing of the data pieces in parallel is carried out over a plurality of steps and a next step is carried out only upon completion of a current step for all of the data pieces.

16. The method according to claim 15, further comprising:
    storing, in the memory of the server, a progress state of the writing for each of the data pieces, wherein
    the writing proceeds to the next step with reference to the progress states.

17. The method according to claim 16, further comprising:
    in each step and for each data piece, transmitting a request to cause the corresponding target storage device to be in a predetermined operation state, and updating the progress state for the data piece upon receiving an acknowledgement from the corresponding target storage device.

18. The method according to claim 17, further comprising:
    for each data piece, transmitting a lock request to cause a corresponding target storage device to deny writing of another data piece at the corresponding logical address, a commit request to write the data piece at the corresponding logical address, and an unlock request to cause the corresponding target storage device to allow writing of another data piece at the corresponding logical address.

19. The method according to claim 13, further comprising:
    for each of the data pieces, encoding the identifier of the data piece, wherein the target storage device is determined based on a first portion of the encoded identifier, and the logical address thereof is determined based on a second portion of the encoded identifier.

20. The method according to claim 19, wherein the encoding includes calculating a hash value of the identifier of the data piece.

* * * * *